United States Patent
Zhang et al.

(10) Patent No.: US 11,620,277 B2
(45) Date of Patent: Apr. 4, 2023

(54) TRANSACTION PROCESSING AT NON-RELATIONAL DATABASES

(71) Applicant: Alibaba Group Holding Limited, George Town (KY)

(72) Inventors: Songshu Zhang, Hangzhou (CN); Yu Jiang, Beijing (CN)

(73) Assignee: Alibaba Group Holding Limited

( * ) Notice: Subject to any disclaimer, the term of this patent is extended or adjusted under 35 U.S.C. 154(b) by 226 days.

(21) Appl. No.: 16/810,366

(22) Filed: Mar. 5, 2020

(65) Prior Publication Data

US 2020/0272620 A1 Aug. 27, 2020

Related U.S. Application Data

(63) Continuation-in-part of application No. PCT/CN2018/102921, filed on Aug. 29, 2018.

(30) Foreign Application Priority Data

Sep. 8, 2017 (CN) .......................... 201710807134.8

(51) Int. Cl.
  *G06F 16/00* (2019.01)
  *G06F 16/23* (2019.01)
  *G06F 11/14* (2006.01)

(52) U.S. Cl.
  CPC ...... *G06F 16/2379* (2019.01); *G06F 11/1474* (2013.01); *G06F 2201/87* (2013.01)

(58) Field of Classification Search
  CPC ...... G06F 9/466; G06F 16/27; G06F 11/1474; G06F 16/951; G06F 16/2379;

(Continued)

(56) References Cited

U.S. PATENT DOCUMENTS 8,006,087 B2   8/2011   Ginter
8,046,327 B2   10/2011  Brodersen
(Continued)

FOREIGN PATENT DOCUMENTS

CN   102831156   12/2012
CN   103412897   11/2013
(Continued)

*Primary Examiner* — Yicun Wu
(74) *Attorney, Agent, or Firm* — Van Pelt, Yi & James LLP

(57) ABSTRACT

Transaction processing at non-relational databases is disclosed, including: receiving, at a non-relational database, a transaction request to perform a transaction branch from a client, wherein the transaction branch is related to a distributed transaction; sending the global transaction ID to a transaction coordinator to indicate that the transaction branch to be performed at the non-relational database is associated with the distributed transaction; receiving, at the non-relational database, a branch ID corresponding to the transaction branch from the transaction coordinator; determining one or more transaction operations to be performed at the non-relational database from the operation content associated with the transaction branch; executing the one or more transaction operations at the non-relational database; and sending a branch status message indicating execution success or failure of the transaction branch to the transaction coordinator.

20 Claims, 18 Drawing Sheets

(58) Field of Classification Search
CPC ............. G06F 16/1865; G06F 16/2322; G06F 16/275; G06F 11/1435; G06F 11/1441; G06F 2201/80; G06F 2201/82; G06F 12/145; G06F 16/24532; G06F 21/52; G06F 2201/87; G06F 2212/1052; G06F 9/445; G06F 9/45504; G06F 11/1446; G06F 11/1471; G06F 11/1448; G06F 11/1451; G06F 11/1464; G06F 11/2023; G06F 11/2094; G06F 11/2097; G06F 16/128; G06F 16/178; G06F 16/2308; G06F 16/2471; G06F 16/252; G06F 16/278; G06F 16/283; G06F 2201/835; G06F 9/461; G06F 11/2058; G06F 11/2074; G06F 2201/84; G06F 16/2365
See application file for complete search history.

(56) References Cited

U.S. PATENT DOCUMENTS

| | | | |
|---|---|---|---|
| 8,051,094 B2 | 11/2011 | Agrawal | |
| 8,650,155 B2 | 2/2014 | Corbin | |
| 8,650,226 B2 | 2/2014 | Bobick | |
| 8,838,534 B2 | 9/2014 | Fowler | |
| 9,124,466 B2 | 9/2015 | Lu | |
| 9,323,569 B2 | 4/2016 | Vermeulen | |
| 9,507,822 B2 | 11/2016 | Weissman | |
| 9,524,186 B2 | 12/2016 | Shen | |
| 9,893,963 B2 | 2/2018 | Bansal | |
| 9,922,075 B2 | 3/2018 | Fowler | |
| 10,169,446 B1 * | 1/2019 | Garlapati | G06F 16/284 |
| 10,452,640 B2 | 10/2019 | Lee | |
| 2005/0182795 A1 * | 8/2005 | Murthy | G06F 16/27 |
| 2013/0066949 A1 * | 3/2013 | Colrain | G06F 9/466 709/203 |
| 2015/0178343 A1 | 6/2015 | Renkes | |
| 2015/0379062 A1 * | 12/2015 | Vermeulen | G06F 16/2365 707/691 |
| 2017/0220617 A1 * | 8/2017 | Bortnikov | G06F 16/2329 |
| 2018/0204193 A1 | 7/2018 | Cacheria, III | |

FOREIGN PATENT DOCUMENTS

| | | |
|---|---|---|
| CN | 103514028 | 1/2014 |
| CN | 104834557 | 8/2015 |
| CN | 106033437 | 10/2016 |
| CN | 106156119 | 11/2016 |

* cited by examiner

TRANSACTION PROCESSING AT NON-RELATIONAL DATABASES

CROSS REFERENCE TO OTHER APPLICATIONS

This application is a continuation-in-part of and claims priority to International (PCT) Application No. PCT/CN2018/102921, entitled NON-RELATIONAL DATABASE TRANSACTION PROCESSING METHOD, APPARATUS AND ELECTRONIC DEVICE filed on Aug. 29, 2018, which is incorporated herein by reference in its entirety for all purposes, which claims priority to China Patent Application No. 201710807134.8, entitled NON-RELATIONAL DATABASE TRANSACTION PROCESSING METHOD, MEANS AND ELECTRONIC DEVICE filed on Sep. 8, 2017 which is incorporated by reference in its entirety for all purposes.

FIELD

The present application relates to a field of database technology. In particular, the present application relates to transaction processing techniques to be performed at a non-relational database.

BACKGROUND

Conventionally, the two-phase commit protocol (2PC) is often used in the distributed transaction field to solve distributed transaction problems involving multiple data resources. Typically, 2PC is implemented using eXtended Architecture (X/Open XA). XA is a distributed transaction processing standard put forward by X/Open. The XA standard mainly defines the interfaces between transaction managers and local resource managers. Relational databases such as Oracle and MySQL implement the XA protocol. Therefore, distributed transaction problems involving these relational database systems may be solved with XA.

However, there are many scenarios in distributed systems where relational database and non-relational database (such as the NoSql database, for example) products are used together. However, only some relational databases support XA protocol while non-relational databases such as NoSql databases typically do not support XA protocol at all. Therefore, business service requirements involving distributed transactions cannot be met in systems using a NoSql database due to the lack of an effective transaction processing method.

SUMMARY

The present application discloses techniques comprising: receiving, at a non-relational database, a transaction request to perform a transaction branch from a client, wherein the transaction branch is related to a distributed transaction, wherein the transaction request comprises operation content associated with the transaction branch and a global transaction ID associated with the distributed transaction; sending the global transaction ID to a transaction coordinator to indicate that the transaction branch to be performed at the non-relational database is associated with the distributed transaction; receiving, at the non-relational database, a branch ID corresponding to the transaction branch from the transaction coordinator; determining one or more transaction operations to be performed at the non-relational database from the operation content associated with the transaction branch; executing the one or more transaction operations at the non-relational database; and sending a branch status message indicating execution success or failure of the transaction branch to the transaction coordinator, wherein the branch status message includes the branch ID corresponding to the transaction branch.

BRIEF DESCRIPTION OF THE DRAWINGS

Various embodiments of the disclosure are disclosed in the following detailed description and the accompanying drawings.

DETAILED DESCRIPTION

Figure 1:
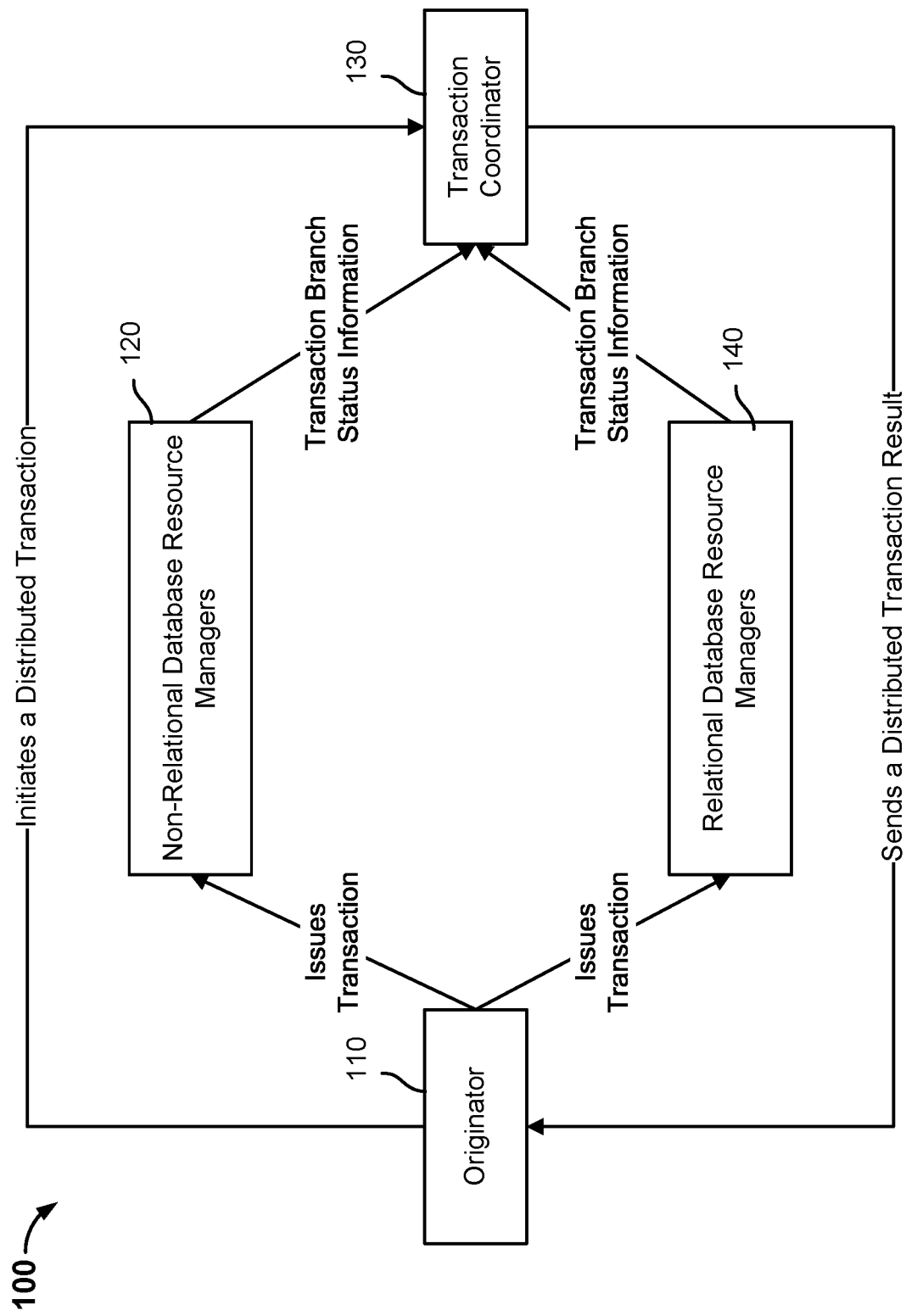
FIG. 1 is a system diagram of a non-relational database distributed transaction processing system in accordance with some embodiments.

The disclosure can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the disclosure may take, may be referred to as techniques. In general, the order of the steps of disclosed processes may be altered within the scope of the disclosure. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the disclosure is provided below along with accompanying figures that illustrate the principles of the disclosure. The disclosure is described in connection with such embodiments, but the disclosure is not limited to any embodiment. The scope of the disclosure is limited only by the claims and the disclosure encompasses numerous alternatives, modifications and equivalents. Numerous specific details are set forth in the following description in order to provide a thorough understanding of the disclosure. These details are provided for the purpose of example and the disclosure may be practiced according to the claims without some or all of these specific details. For the purpose of clarity, technical material that is known in the technical fields related to the disclosure has not been described in detail so that the disclosure is not unnecessarily obscured.

Exemplary embodiments of the present disclosure are described in greater detail below with reference to the drawings. Although the drawings depict exemplary embodiments of the present disclosure, it should be noted that the present disclosure may be implemented in various forms and should not be limited by the embodiments expounded here. On the contrary, the purpose of providing these embodiments is to enable a more thorough understanding of the present disclosure and to communicate the present disclosure in its entirety to persons having skill in the art.

The following are some concepts that are referenced throughout the application:

"Relational database": A relational database is a database that is based on the relational model and that draws on the algebra of sets and other mathematical concepts and methods to process data in the database. Various entities and various links between entities in today's world are expressed in terms of the relational model.

"Non-relational database": A NoSql database is an example of a non-relational database model. Unlike a relational database, a non-relational database stores data without explicit and structured mechanisms to link data from different tables (or buckets) to one another. In various embodiments, a non-relational database's data is organized, indexed, and stored according to key-value pairs.

"Transaction": A transaction is a unit of work that is performed within a database. A transaction includes all of the operations executed between "begin transaction" and "end transaction." A transaction should have four attributes: atomicity, consistency, isolation, and durability. These four attributes generally are referred to as the ACID properties.

"Transaction originator": A transaction originator is sometimes referred to simply as "originator." An originator is the service, device, and/or application that originates a transaction.

"Distributed transaction": A distributed transaction is a transaction that involves data operation resources from two or more participating sources (e.g., two or more participating databases).

"Global transaction": A global transaction is a distributed transaction that is managed and coordinated by resource managers. A global transaction may encompass multiple databases and processes. Each portion of the global transaction that is to be executed at a participating database is called a "transaction branch."

"XA Protocol": Initially put forward by Tuxedo, the XA protocol was organized by X/Open as an interface standard for resource managers (databases) and transaction coordinators. The XA standard mainly defines the interfaces between the transaction coordinator (which is sometimes referred to as the "transaction manager") and local resource managers. The XA standard employs a two-phase commit (2PC) approach to managing distributed transactions. The first phase of the 2PC protocol is the voting phase, in which all participants, i.e., all of the resource managers executing the various, respective transaction branches, provide feedback on whether their own transaction branch can succeed to the transaction coordinator, i.e., the transaction manager. The second phase of the 2PC protocol is the completion phase. The transaction coordinator, based on feedback from all participants, notifies all participants to either commit or roll back the transaction branch (at a consistent pace on all branches). When performing local operations, each resource manager engages in database lock contention and can only participate in 2PC operations once it has obtained a lock. Otherwise, the resource manager will directly report a transaction branch failure.

Existing distributed transaction models for relational databases include components serving in the three roles of "transaction originator," "resource manager," and "transaction coordinator." The "transaction originator" sends requests and reports concerning distributed transaction statuses to the transaction coordinator, is responsible for distributed transaction boundary controls, and issues call instructions to resource managers. "Resource managers" are responsible for specific business operations (e.g., associated with their respective local transaction branch) and report the statuses of business operations to the transaction coordinator. The "transaction coordinator" is responsible for managing the status of the overall distributed transaction and for pushing the distributed transaction to completion.

However, because some non-relational databases do not support the distributed transaction model described above, only some relational databases support XA protocol in many scenarios where relational database and non-relational (e.g., NoSql) database products are used together. However, the inability of some non-relational databases to support 2PC using a protocol such as XA limits the ability to perform distributed transactions across heterogeneous databases.

Embodiments of a distributed transaction resource manager for non-relational databases are described herein. As will be described in further detail below, a non-relational database resource manager can collaborate with a distributed transaction coordinator in interacting with other (e.g., relational database) resource managers to achieve service link-level distributed transaction control that spans multiple, heterogeneous data storage resources.

FIG. 1 is a system diagram of a non-relational database distributed transaction processing system in accordance with some embodiments. System 100 includes originator 110, non-relational database resource managers 120, transaction coordinator 130, and relational database resource managers 140. The roles and functions of originator 110, transaction coordinator 130, and relational database resource managers 140 have been introduced above. As such, the following will focus on describing "non-relational database resource managers."

A non-relational database resource manager in a complete distributed transaction model needs to confront and solve two problems. The first problem is reading the transaction content, i.e., understanding the operation statements, issued by the originator and executing transaction operations directed at the non-relational database based on the operation statements. The second problem is recording the transaction operations and generating a transaction log so that there will be a referenceable operation record when the transaction coordinator later needs to commit or roll back a transaction branch. To address the first problem, in various embodiments, various types of operation statements that have been executed at non-relational databases are learned and understood offline by non-relational database resource managers in advance of receiving operation statements at runtime. Moreover, the non-relational database resource manager is configured with rules for analyzing operation statements so that the non-relational database resource manager can determine the specific operation content of a transaction issued by the originator.

In the distributed transaction model, in various embodiments, the originator first issues a notification to begin a distributed transaction to the transaction coordinator. The originator then issues the transaction in the form of a transaction operation instruction to each resource manager, including one or both of non-relational database resource manager(s) and relational database resource manager(s). After receiving the transaction operation instruction, a non-relational database resource manager associated with a non-relational database activates registration (e.g., recordation) of a transaction branch with the transaction coordinator. The non-relational database resource manager analyzes the content of the transaction issued by the originator to determine one or more transaction operations. The non-relational database resource manager then executes the transaction operation(s) that were determined based on the analysis result. The non-relational database resource manager also records the transaction operation(s) in a corresponding transaction log. The non-relational database resource manager submits the progress/results of the locally executed transaction operations as a "transaction branch status message" to the transaction coordinator. The transaction coordinator receives the respective transaction branch status message from each non-relational database resource manager and/or relational database resource manager that corresponds to a database that is participating in the transaction.

Based on the respective transaction branch status message from each participating database, the transaction coordinator determines whether the participating databases should commit or roll back the transaction. For example, if the transaction branch status message from each participating database indicated that the transaction operations on the corresponding database were successful, then the transaction coordinator would instruct each participating database to commit the transaction branch operation results. Otherwise, for example, if the transaction branch status message from at least one participating database indicated that the transaction branch operations on the corresponding database were not successful, then the transaction coordinator would instruct each participating database to roll back the transaction branch operation results. Based on the instruction from the transaction coordinator, the resource manager at each participating database either commits or rolls back the transaction branch operations corresponding to the current transaction. Depending on the execution result for the transaction that it had issued, the originator issues a distributed transaction complete or incomplete result to the transaction coordinator. It is clear from the processes described above that the resource managers are the executing entities at transaction operations at their local databases and that there are two phases involved in each participating database within an entire distributed transaction model: Phase 1: the transaction branch execution and the status message submission process and Phase 2: the transaction branch commit/roll back process. These two processes sequentially correspond to the two phases of the two-phase commit (2PC) protocol. A detailed explanation of the logic of each of these two processes of the 2PC protocol will be provided below.

Figure 2:
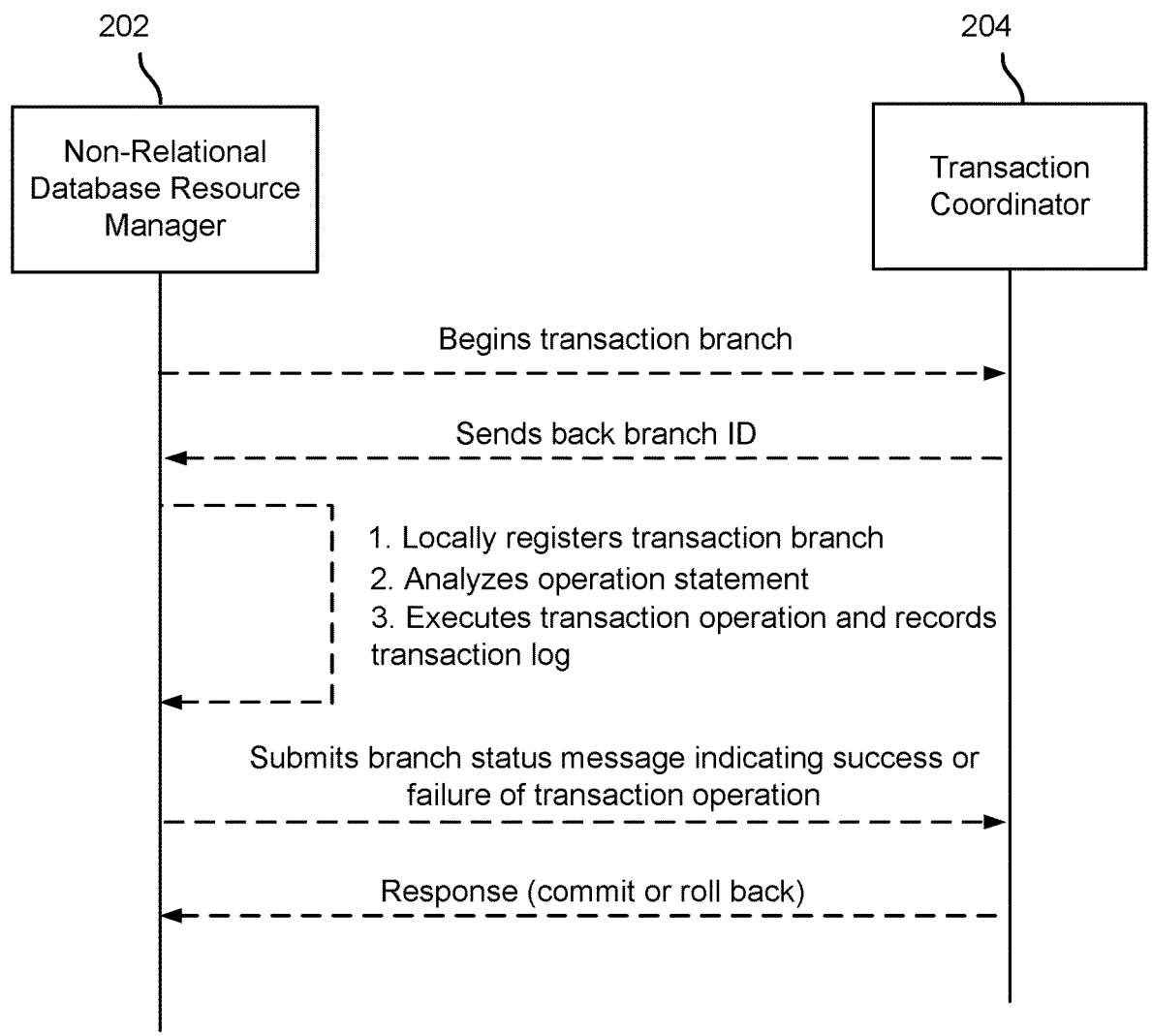
FIG. 2 is a sequence diagram showing an example interaction between a non-relational database resource manager and a transaction coordinator in processing a distributed transaction in accordance with some embodiments in Phase 1 of the 2PC protocol.

FIG. 2 is a sequence diagram showing an example interaction between a non-relational database resource manager and a transaction coordinator in processing a distributed transaction in accordance with some embodiments in Phase 1 of the 2PC protocol.

As shown in FIG. 2, after receiving a transaction issued by an originator, non-relational database resource manager 202 begins a transaction branch associated with the transaction with transaction coordinator 204 and acquires a branch identifier (ID) corresponding to the transaction branch. The transaction branch refers to the portion of the transaction that is relevant to non-relational database resource manager 202. Next, non-relational database resource manager 202 locally executes the following operations:

1. Non-relational database resource manager 202 registers the current to-be-processed transaction locally using the acquired branch ID and thereby labels the transaction branch.

2. Based on prior (e.g., offline) machine learning of non-relational database operation statements, non-relational database resource manager 202 analyzes the operation statements in the currently issued transaction in order to determine the corresponding operation content.

3. Non-relational database resource manager 202 executes transaction operations directed at the corresponding non-relational database based on the operation content determined through the analysis performed at step 2 and records the transaction log in the database.

Lastly, non-relational database resource manager 202 sends a branch status message indicating success or failure of the locally executed transaction branch operations to transaction coordinator 204. After non-relational database resource manager 202 sends the branch status message to transaction coordinator 204, transaction coordinator 204 is configured to either issue a commit or a roll back instruction to non-relational database resource manager 202 with respect to non-relational database resource manager 202's transaction branch.

When non-relational database resource manager 202 receives a response from transaction coordinator 204, non-relational database resource manager 202 ends the transaction branch execution and status information submission process.

Figure 3:
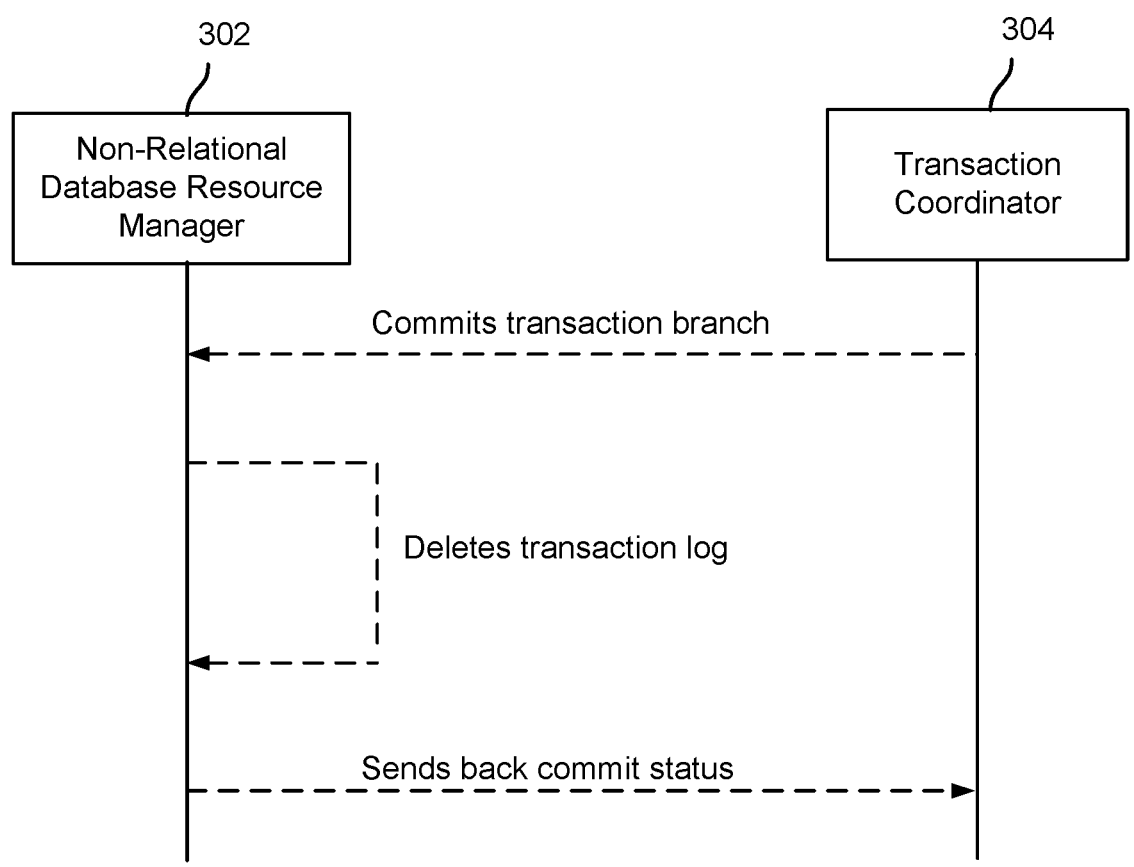
FIG. 3 is a sequence diagram showing an example interaction between a non-relational database resource manager and a transaction coordinator in processing a distributed transaction in accordance with some embodiments in Phase 2 of the 2PC protocol, where the transaction coordinator instructs the participating databases to perform a transaction commit.

FIG. 3 is a sequence diagram showing an example interaction between a non-relational database resource manager and a transaction coordinator in processing a distributed transaction in accordance with some embodiments in Phase 2 of the 2PC protocol, where the transaction coordinator instructs the participating databases to perform a transaction commit.

As shown in FIG. 3, after receiving the transaction branch commit instruction issued by transaction coordinator 304, non-relational database resource manager 302 deletes the transaction log that was previously stored in the non-relational database and generated in the process of executing this transaction branch. Non-relational database resource manager 302 then sends back to transaction coordinator 304 a status message indicating that the branch transaction was committed, which thus completes the transaction commit process.

Figure 4:
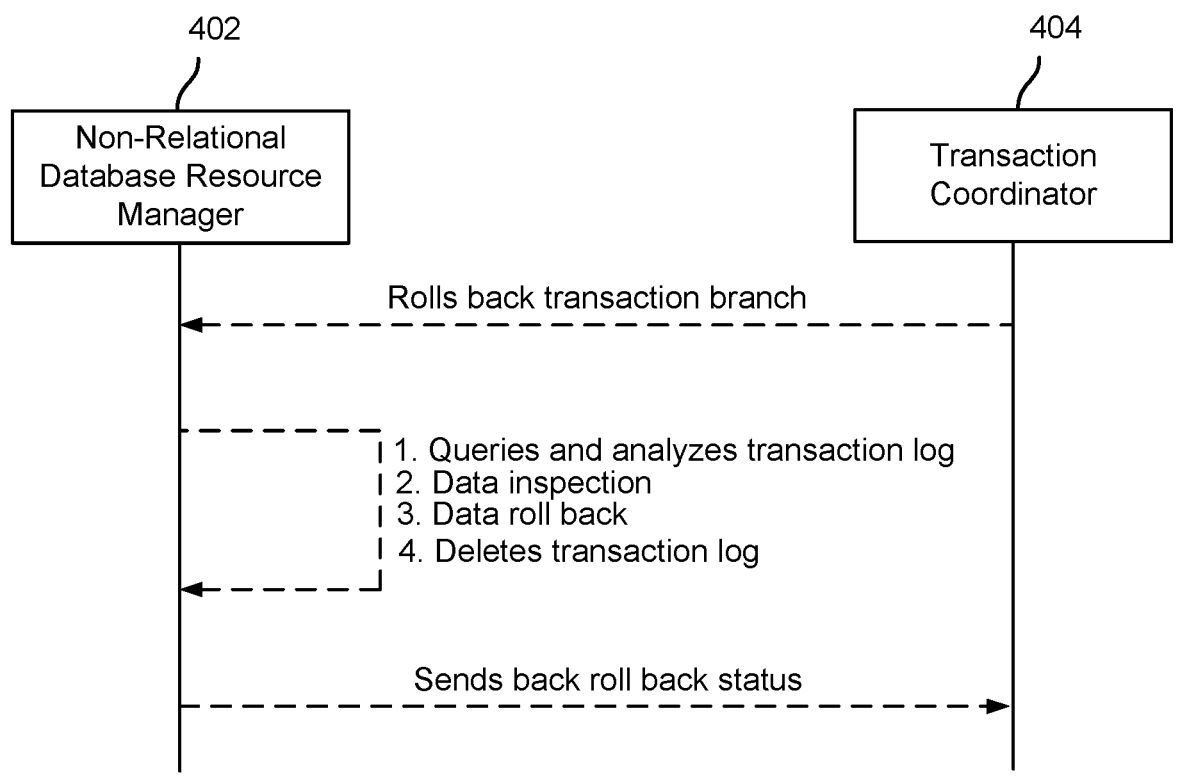
FIG. 4 is a sequence diagram showing an example interaction between a non-relational database resource manager and a transaction coordinator in processing a distributed transaction in accordance with some embodiments in Phase 2 of the 2PC protocol, where the transaction coordinator instructs the participating databases to perform a transaction roll back.

FIG. 4 is a sequence diagram showing an example interaction between a non-relational database resource manager and a transaction coordinator in processing a distributed transaction in accordance with some embodiments in Phase 2 of the 2PC protocol, where the transaction coordinator instructs the participating databases to perform a transaction roll back. Given that a transaction coordinator can either send a transaction commit instruction (an example of which is shown in FIG. 3) or a transaction roll back instruction in Phase 2 of the 2PC protocol after Phase 1 of the 2PC protocol (an example of which is shown in FIG. 2), only one of the example sequence of FIG. 3 or the example sequence of FIG. 4 is to occur.

As shown in FIG. 4, after receiving the roll back transaction branch instruction issued by transaction coordinator 404, non-relational database resource manager 402 uses its locally registered transaction branch ID corresponding to the transaction to look up the corresponding transaction log in the non-relational database. Then, non-relational database resource manager 402 compares the data recorded in the transaction log to the data in the non-relational database after the transaction operation. If the data are the same, this means that no dirty writes have occurred in relation to this data. In various embodiments, a "dirty write" comprises a write that has occurred on data affected by a transaction operation in the interim between the transaction operation being executed at a database but before the transaction operation is committed. The occurrence of a dirty write may be indicative of an error that may cause an alert to be sent to a user (e.g., a database administrator). However, when a dirty write is not detected, the data may be rolled back based on the transaction log. After the data is rolled back, non-relational database resource manager 402 deletes the transaction log that was previously stored in the non-relational database and generated in the process of executing this transaction branch. Lastly, non-relational database resource manager 402 sends back to transaction coordinator 404 a status message indicating that the branch transaction was rolled back, which completes the transaction roll back process.

As described herein, in various embodiments, new components that are referred to as "non-relational database resource managers" are added to non-relational databases. Moreover, non-relational database resource managers generate transaction logs while implementing 2PC distributed transaction operations. As a result, the existing XA two-phase protocol is transformed and becomes compatible with and extends the operating interface for non-relational databases. In various embodiments, non-relational database resource managers perform offline (e.g., machine) learning of non-relational database operation statements to be able to perceive and host non-relational database operations when handling distributed transactions at runtime. As such, non-relational databases are thus improved to meet the requirements of distributed transaction management operations, which result in distributed transaction control solutions being able to span heterogeneous data storage resources (e.g., both relational and non-relational databases).

Figure 5:
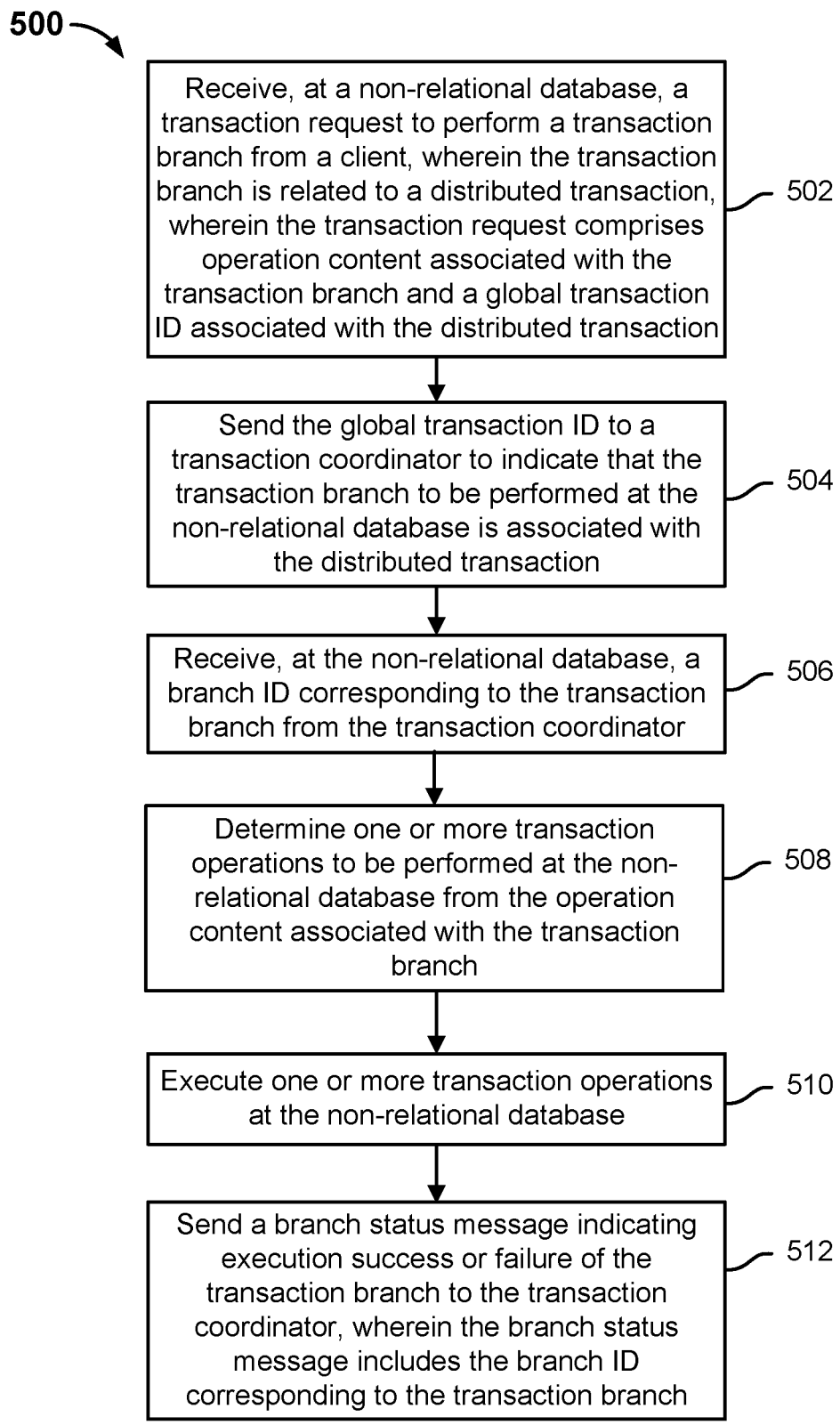
FIG. 5 is a flow diagram showing an embodiment of a process of handling a distributed transaction in accordance with some embodiments in Phase 1 of the 2PC protocol.

FIG. 5 is a flow diagram showing an embodiment of a process of handling a distributed transaction in accordance with some embodiments in Phase 1 of the 2PC protocol. In some embodiments, process 500 is implemented at a non-relational database resource manager such as non-relational database resource manager 120 of system 100 of FIG. 1.

At 502, a transaction request to perform a transaction branch is received, at a non-relational database, from a client, wherein the transaction branch is related to (e.g., included in) a distributed transaction. The transaction request comprises operation content associated with the transaction branch and a global transaction ID associated with the distributed transaction. The distributed transaction can involve data operations on multiple participating sources (e.g., multiple databases).

In process 500, the "client" is the transaction originator. For example, the client may be an application. In various embodiments, prior to the execution of process 500, when the client wants to originate a distributed transaction, the client first declares that it is beginning a new distributed transaction to the transaction coordinator. Then the client obtains, from the transaction coordinator, a global transaction ID corresponding to the distributed transaction. The global transaction ID corresponding to the distributed transaction will be used to track all of the transaction branches corresponding to the distributed transaction.

After receiving the global transaction ID corresponding to the distributed transaction, the client issues a respective transaction request to the resource manager of each participating database involved in the distributed transaction. In some embodiments, the participating databases of the distributed transaction include at least one relational database and at least one non-relational database. In some embodiments, the participating databases of the distributed transaction include two or more non-relational databases and no relational databases. Each transaction request includes the global transaction ID associated with the distributed transaction as well as at least the operation content associated with the transaction branch associated with each specific participating database so that each database's corresponding resource manager will execute corresponding transaction operations of that database's transaction branch based on the transaction request.

At 504, the global transaction ID is sent to a transaction coordinator to indicate that the transaction branch to be performed at the non-relational database is associated with the distributed transaction.

After receiving the transaction request sent by the client, the non-relational database resource manager extracts the global transaction ID from the transaction request and then sends the global transaction ID in a registration request to the transaction coordinator. The registration request is configured to request the transaction coordinator to record that the transaction operations to be performed by the non-relational database resource manager and/or its corresponding non-relational database are included in a single transaction branch that is part of the distributed transaction that is identified by the global transaction ID. After receiving the global transaction ID from the non-relational database resource manager, the transaction coordinator assigns a branch ID to the transaction branch and sends the branch ID back to the resource manager. Because the branch ID corresponds to the global transaction ID, the branch ID enables the transaction coordinator to determine that the transaction branch associated with that branch ID is part of the distributed transaction that is associated with the global transaction ID. For example, the transaction coordinator may store a mapping between the global transaction ID and each corresponding branch ID. In another example, the branch ID includes the value of its corresponding global transaction ID.

At 506, a branch ID corresponding to the transaction branch is received, at the non-relational database, from the transaction coordinator.

After receiving the branch ID, the non-relational database resource manager records the branch ID locally as the identifier corresponding to the current transaction branch.

At 508, one or more transaction operations to be performed at the non-relational database are determined from the operation content associated with the transaction branch.

In various embodiments, the operation content included in the transaction request to the non-relational database comprises unmodified operation statements that are normally directly sent to non-relational databases (rather than to the non-relational database resource managers thereof). In some embodiments, rules that enable the non-relational database resource managers to execute the correct operations based on operation statements that are directed to non-relational databases are configured in the non-relational database resource managers. In some embodiments, the rules are generated offline, by applying machine learning to non-relational database operation statements. As such, in some embodiments, the transaction originator (client) will not need to change the type of operation content that normally is intended for the non-relational databases themselves, to accommodate the addition of non-relational database resource managers.

In various embodiments, by applying the configured comprehension rules to the operation content that is included in the transaction request, a non-relational database resource manager is configured to determine the transaction operations to be performed at the non-relational database.

At 510, the one or more transaction operations are executed at the non-relational database.

The non-relational database resource manager executes the one or more determined transaction operations directed at the corresponding non-relational database. Then, the non-relational database resource manager records the correspondingly generated operation log as a corresponding transaction log. For example, a transaction log indicates which transaction operations were performed at the non-relational database and/or the new data that was dictated by the transaction branch to be written to the non-relational database.

At 512, a branch status message indicating execution success or failure of the transaction branch is sent to the transaction coordinator, wherein the branch status message includes the branch ID corresponding to the transaction branch.

Upon completion of the execution of all of the determined transaction operations of the transaction branch, the non-relational database resource manager sends a branch status message indicating successful execution of the current transaction branch to the transaction coordinator. If an exception occurred in any stage of the steps described above, the non-relational database resource manager sends a branch status message indicating failed execution of the current transaction branch to the transaction coordinator.

After performing step 512, the non-relational database resource manager has completed execution of Phase 1 of the 2PC distributed transaction workflow as it relates to a non-relational database in accordance with some embodiments.

In some embodiments, one type of a non-relational database is a "key-value store" (which may sometimes be referred to as a "KV store").

Figure 6:
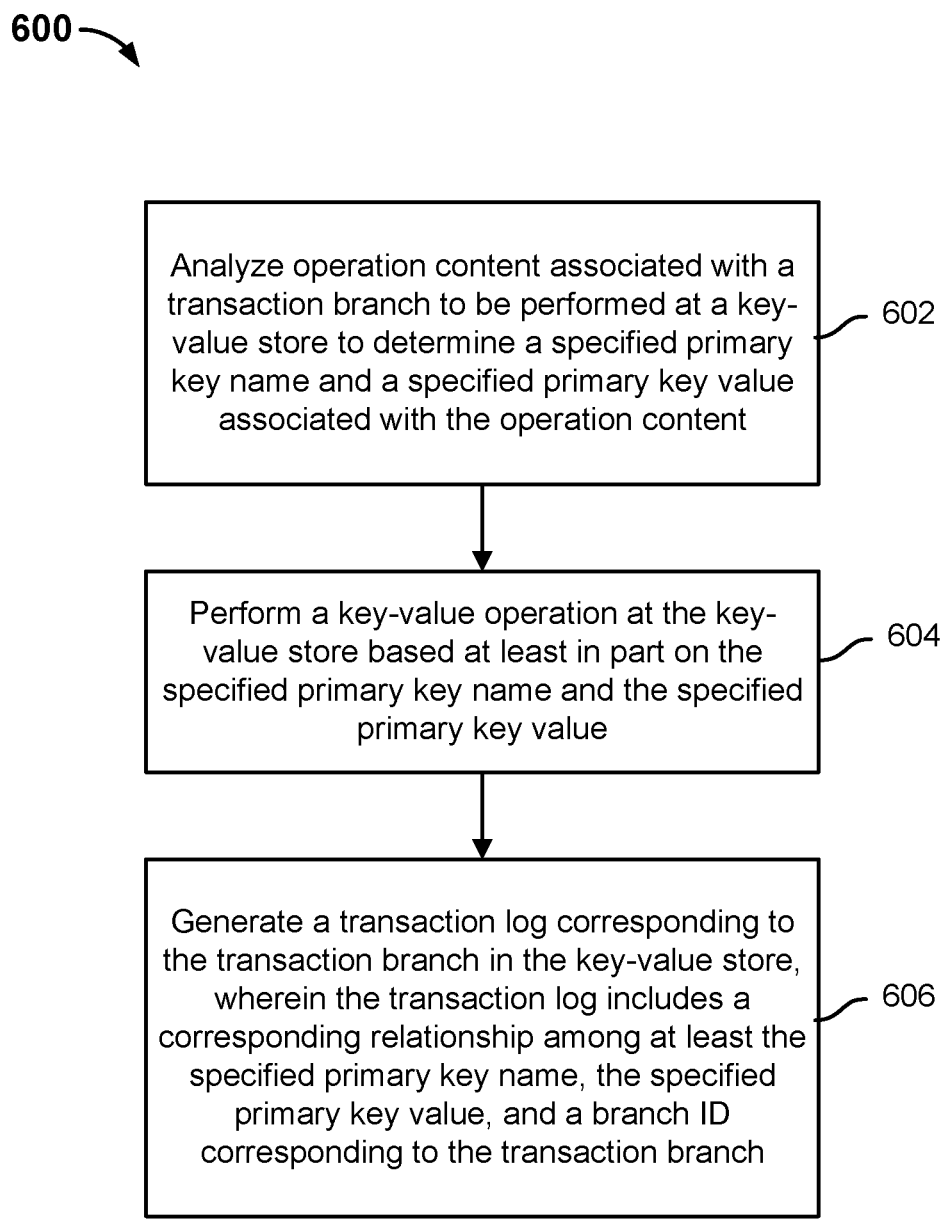
FIG. 6 is a flow diagram showing an example process of a process of handling a distributed transaction at a key-value store type of a non-relational database in accordance with some embodiments in Phase 1 of the 2PC protocol.

FIG. 6 is a flow diagram showing an example process of a process of handling a distributed transaction at a key-value store type of a non-relational database in accordance with some embodiments in Phase 1 of the 2PC protocol. In some embodiments, process 600 is implemented at a non-relational database resource manager of a key-value store such as non-relational database resource manager 120 of system 100 of FIG. 1.

Process 600 applies, at least, steps 508 and 510 of process 500 of FIG. 5 to a non-relational database resource manager corresponding to a non-relational database that is a key-value store.

At 602, operation content associated with a transaction branch to be performed at a key-value store is analyzed to determine a specified primary key name and a specified primary key value associated with the operation content.

For example, to extract rules that enable the recognition of primary key names and primary key values in operation statements directed at key-value stores, offline learning is performed in relation to syntax and the meaning of key characters and features in operation statements directed at key-value stores. In some embodiments, a training set of labeled syntax and meaning of key characters and features is sent to a neural network, which extracts the rules. Then, based on such rules, a non-relational database resource manager executing at the key-value store analyzes the operation content of the current transaction branch to obtain the primary key name and primary key value specified in the operation content. Furthermore, based on such rules, a non-relational database resource manager executing at the key-value store analyzes the operation content of the current transaction branch to obtain a type of operation to be performed using the specified primary key name and the specified primary key value.

At 604, a key-value operation directed at the key-value store is performed based at least in part on the specified primary key name and the specified primary key value.

For example, if the operation content indicated a write (e.g., INSERT) operation, then the specified primary key name extracted from the operation content is looked up in the key-value store, and the stored primary key value in the key-value store that corresponds to (e.g., matches) the specified primary key name is updated to be equal to or otherwise set to a function of the specified primary key value that was extracted from the operation content. In a specific example, in the operation of INSERT A (primary key name)=5 (primary key value) to A (primary key name)=3 (primary key value), the "specified primary key name" is "A," the "stored primary key value" is "5," and the "specified primary key value" is "3."

At 606, a transaction log corresponding to the transaction branch is generated in the key-value store, wherein the transaction log includes a corresponding relationship among at least the specified primary key name, the specified primary key value, and a branch ID corresponding to the transaction branch.

Since data operations directed at non-relational databases generate log data, in some embodiments, a non-relational database resource manager is configured to write data indicating a corresponding relationship among, at least, the specified primary key value and the specified primary key name that were specified in the operation content and also the branch ID for the current transaction branch into a transaction log corresponding to the transaction branch. In some embodiments, the transaction log is stored at the key-value store. In some embodiments, in addition to the specified primary key value, the stored primary key value that had previously corresponded to the specified primary key name in the key-value store prior to being overwritten by the specified primary key value of the operation content is also included in the transaction log. As such, for a key-value operation of the transaction branch, the transaction log may store a specified primary key name and also two key values: a specified primary key value that was written to the database after the execution of the operation and the previously stored primary key value that had been overwritten by the specified primary key value as a result of the execution of the operation. As will be described further below, maintaining the previously stored primary key value in the transaction log may facilitate rolling back the key-value operation at the database in the event that the transaction coordinator were to issue a transaction roll back instruction during Phase 2 of the 2PC protocol.

Figure 7:
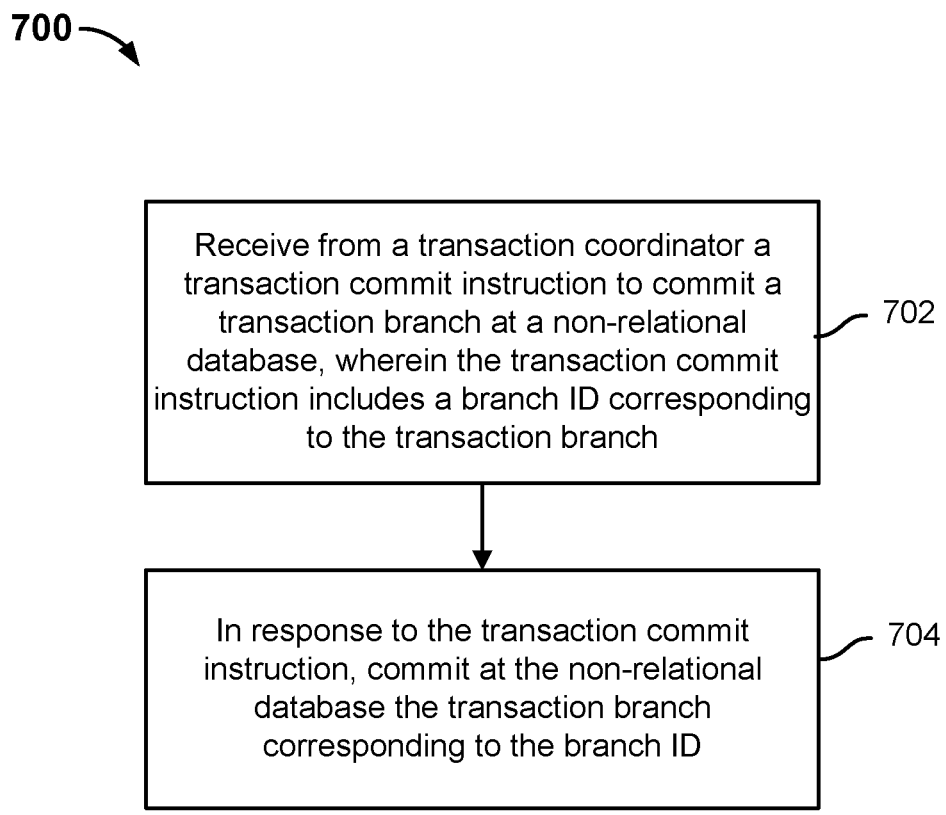
FIG. 7 is a flow diagram showing an embodiment of a process of handling a distributed transaction in accordance with some embodiments in Phase 2 of the 2PC protocol, in which a transaction commit instruction is issued by the transaction coordinator.

FIG. 7 is a flow diagram showing an embodiment of a process of handling a distributed transaction in accordance with some embodiments in Phase 2 of the 2PC protocol, in which a transaction commit instruction is issued by the transaction coordinator. In some embodiments, process 700 is implemented at a non-relational database resource manager such as non-relational database resource manager 120 of system 100 of FIG. 1.

Process 700 is an example process describing Phase 2 of the 2PC protocol at a non-relational database resource manager that may occur after Phase 1 of the 2PC protocol at the non-relational database resource manager, an example of which is described in process 500 of FIG. 5 or process 600 of FIG. 6, above.

At 702, a transaction commit instruction to commit a transaction branch at a non-relational database is received from a transaction coordinator, wherein the transaction commit instruction includes a branch ID corresponding to the transaction branch.

In some embodiments, after the transaction coordinator receives transaction branch messages from all the participating databases (in Phase 1 of the 2PC protocol) of a distributed transaction and if all such transaction branch messages indicate execution success at their respective databases, then the transaction coordinator sends a transaction commit instruction to the non-relational resource manager of each participating non-relational database (and also the relational resource manager of each participating relational database). The transaction commit instruction instructs for the resource manager of each participating database to commit the one or more transaction operations that had been performed at that database in relation to that database' transaction branch within a distributed transaction. The commit instruction that is sent to each participating database includes the branch ID of the respective transaction branch that had been executed at that particular database.

At 704, in response to the transaction commit instruction, the transaction branch corresponding to the branch ID is committed at the non-relational database.

After receiving the transaction commit instruction sent by the transaction coordinator, the non-relational resource manager uses the branch ID that is included in the commit instruction to find the transaction log associated with the transaction branch that had been executed at the local database and processes the transaction log to commit this transaction branch within the database.

Figure 8:
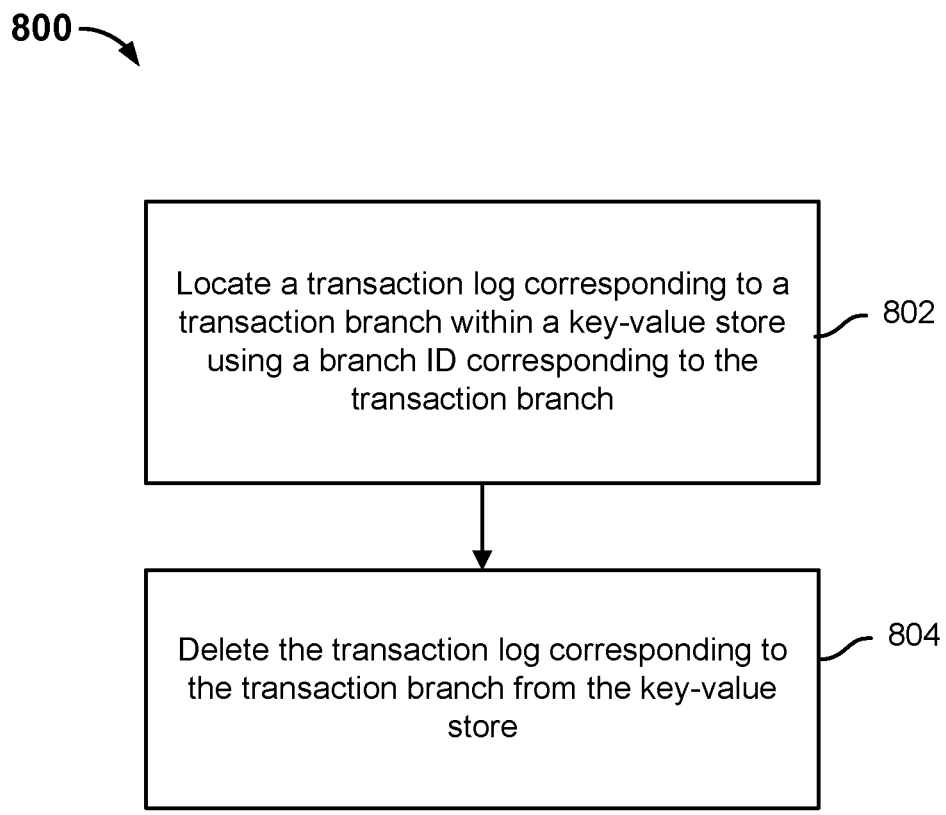
FIG. 8 is a flow diagram showing an example process of a process of handling a distributed transaction at a key-value store type of a non-relational database in accordance with some embodiments in Phase 2 of the 2PC protocol, in which a transaction commit instruction is issued by the transaction coordinator.

FIG. 8 is a flow diagram showing an example process of a process of handling a distributed transaction at a key-value store type of a non-relational database in accordance with some embodiments in Phase 2 of the 2PC protocol, in which a transaction commit instruction is issued by the transaction coordinator. In some embodiments, process 800 is implemented at a non-relational database resource manager of a key-value store such as non-relational database resource manager 120 of system 100 of FIG. 1.

Process 800 applies, at least, step 704 of process 700 of FIG. 7 to a non-relational database resource manager corresponding to a non-relational database that is a key-value store.

At 802, a transaction log corresponding to a transaction branch is located within a key-value store using a branch ID corresponding to the transaction branch.

At 804, the transaction log corresponding to the transaction branch is deleted from the key-value store.

The non-relational database resource manager uses the branch ID that was included in the transaction commit instruction that it had received from the transaction coordinator to look up in the key-value store a stored transaction log that corresponds to that branch ID. The transaction log corresponding to the branch ID had been generated and stored for the transaction branch associated with the branch ID. As mentioned above, in some embodiments, a transaction log includes, at least, but not limited to: the primary key name and primary key value that were specified by a transaction operation of the transaction branch and the branch ID corresponding to the transaction branch. In some embodiments, the transaction log additionally includes the previously stored primary key value that had been overwritten in the key-value store by the primary key value that was specified by a transaction operation of the transaction branch.

After the transaction log is found in the key-value store, it is deleted. In some embodiments, "deleting" the transaction log includes marking the transaction log for deletion or garbage collection. Once the transaction log is deleted, the transaction branch is determined to be committed. After the transaction branch is committed, the results of the transaction operations associated with the transaction branch may no longer be rolled back (e.g., to the state before the transaction operations were executed).

Figure 9:
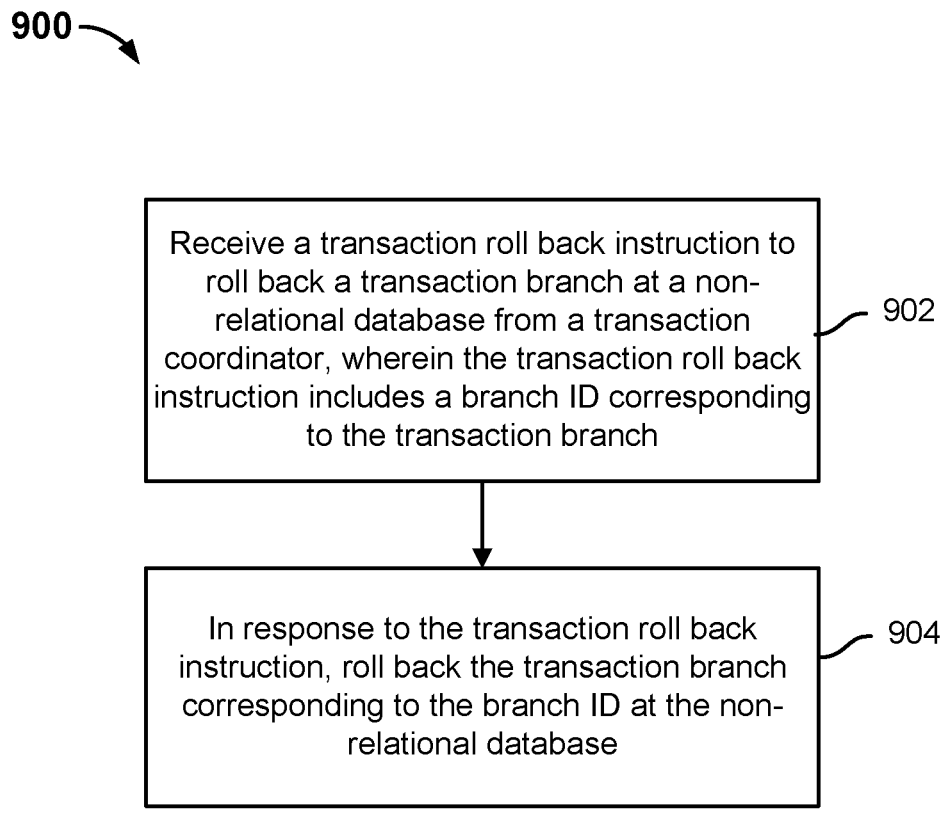
FIG. 9 is a flow diagram showing an embodiment of a process of handling a distributed transaction in accordance with some embodiments in Phase 2 of the 2PC protocol, in which a transaction roll back instruction is issued by the transaction coordinator.

FIG. 9 is a flow diagram showing an embodiment of a process of handling a distributed transaction in accordance with some embodiments in Phase 2 of the 2PC protocol, in which a transaction roll back instruction is issued by the transaction coordinator. In some embodiments, process 900 is implemented at a non-relational database resource manager such as non-relational database resource manager 120 of system 100 of FIG. 1.

Process 900 is an example process describing Phase 2 of the 2PC protocol at a non-relational database resource manager that may occur after Phase 1 of the 2PC protocol at the non-relational database resource manager, an example of which is described in process 500 of FIG. 5 or process 600 of FIG. 6, above. In relation to process 700 of FIG. 7, process 900 is an alternative example process of Phase 2 of the 2PC protocol.

At 902, a transaction roll back instruction to roll back a transaction branch at a non-relational database is received from a transaction coordinator, wherein the transaction roll back instruction includes a branch ID corresponding to the transaction branch.

In some embodiments, after the transaction coordinator receives transaction branch messages from all the participating databases (in Phase 1 of the 2PC protocol) of a distributed transaction and if at least one transaction branch message indicates execution failure at their respective databases, then the transaction coordinator sends a transaction roll back instruction to the non-relational resource manager of each participating non-relational database (and also the relational resource manager of each participating relational database). The transaction roll back instruction instructs for the resource manager of each participating database to roll back the one or more transaction operations that had been performed at that database in relation to that database' transaction branch within a distributed transaction. To "roll back" may be thought of as undoing the transaction operations pertaining to a transaction branch to revert to a state of the key value that had existed prior to the execution of the transaction operations pertaining to the transaction branch. The roll back instruction that is sent to each participating database includes the branch ID of the respective transaction branch that had been executed at that particular database.

At 904, in response to the transaction roll back instruction, the transaction branch corresponding to the branch ID is rolled back at the non-relational database.

After receiving the transaction roll back instruction sent by the transaction coordinator, the non-relational resource manager uses the branch ID that is included in the commit instruction to find the transaction log associated with the transaction branch that had been executed at the local database and processes the transaction log to roll back this transaction branch within the database.

Figure 10:
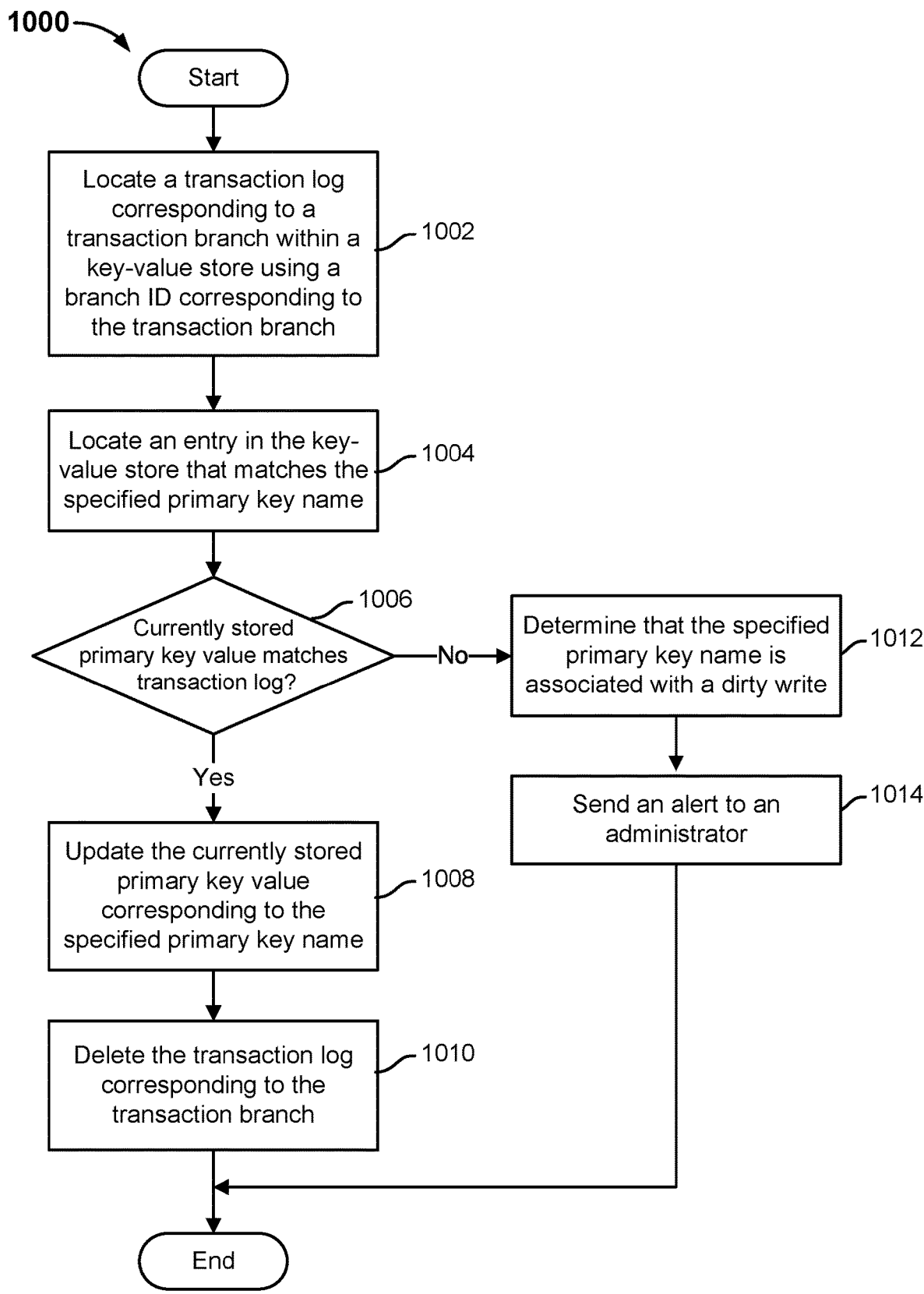
FIG. 10 is a flow diagram showing an example process of a process of handling a distributed transaction at a key-value store type of a non-relational database in accordance with some embodiments in Phase 2 of the 2PC protocol, in which a transaction roll back instruction is issued by the transaction coordinator.

FIG. 10 is a flow diagram showing an example process of a process of handling a distributed transaction at a key-value store type of a non-relational database in accordance with some embodiments in Phase 2 of the 2PC protocol, in which a transaction roll back instruction is issued by the transaction coordinator. In some embodiments, process 1000 is implemented at a non-relational database resource manager of a key-value store such as non-relational database resource manager 120 of system 100 of FIG. 1.

Process 1000 applies, at least, step 904 of process 900 of FIG. 9 to a non-relational database resource manager corresponding to a non-relational database that is a key-value store.

At 1002, a transaction log corresponding to a transaction branch is located within a key-value store using a branch ID corresponding to the transaction branch.

In various embodiments, the transaction log includes, but is not limited to, one or more of the following: a specified primary key name specified by the transaction branch, a specified primary key value specified by the transaction branch, a transaction operation associated with the transaction branch, a previously stored primary key value, and the branch ID.

The non-relational database resource manager uses the branch ID that was included in the transaction roll back instruction that it had received from the transaction coordinator to look up in the key-value store a stored transaction log that corresponds to that branch ID. The transaction log corresponding to the branch ID had been generated and stored for the transaction branch associated with the branch ID. As mentioned above, in some embodiments, a transaction log includes, at least, but not limited to: the primary key name and primary key value that were specified by a transaction operation of the transaction branch and the branch ID corresponding to the transaction branch. In some embodiments, the transaction log additionally includes the previously stored primary key value that had been overwritten in the key-value store by the primary key value that was specified by a transaction operation of the transaction branch.

At 1004, an entry in the key-value store that matches the specified primary key name is located. The entry in the key-value store that matches the specified primary key name of the transaction log is located.

At 1006, it is determined whether a currently stored primary key value corresponding to the specified primary key name in the entry matches the specified primary key value. In the event that the currently stored primary key value corresponding to the specified primary key name in the entry matches the specified primary key value, control is transferred to 1008. Otherwise, in the event that the currently stored primary key value corresponding to the specified primary key name in the entry does not match the specified primary key value, control is transferred to 1012.

The currently stored primary key value in the located entry corresponding to the specified primary key name is compared to the specified primary key value of the transaction log. If the currently stored primary key value in the located entry corresponding to the specified primary key name is the same as the specified primary key value of the transaction log, then it means that the specified primary key value of the transaction log has been unchanged since the execution of the transaction branch and that a dirty write did not occur. However, if the currently stored primary key value in the located entry corresponding to the specified primary key name is not the same as the specified primary key value of the transaction log, then it means that the specified primary key value of the transaction log had been changed since the execution of the transaction branch and that a dirty write did occur. A dirty write may occur if appropriate protections had not been made on the key-value store and a transaction was able to execute on data in the key-value store that had been affected by another transaction that had executed but not yet committed.

For example, the content recorded in the transaction log is "set A (primary key name)=5 (primary key value) to A (primary key name)=3 (primary key value)." Thus, the corresponding entry recorded in the current key-value store should include A=3. If the data recorded in that entry of the key-value store is not A=3, but rather another value such as A=4, for example, then the specified primary key value in the transaction log and the currently stored primary key value corresponding to the same specified primary key name in the current key-value store are not the same, and is therefore indicative of a dirty write in relation to the specified primary key value in the key-value store.

At 1008, the currently stored primary key value corresponding to the specified primary key name is updated.

When the specified primary key value in the transaction log and the currently stored primary key value corresponding to the same specified primary key name in the current key-value store are the same, then the transaction branch corresponding to the transaction log can be successfully rolled back. In some embodiments, to roll back the transaction branch corresponding to the transaction log, the transaction operation that was performed on the primary key value in the entry is set to invalid. As a result of setting the transaction operation that was performed on the primary key value in the entry to invalid, the primary key value of the entry will roll back to its value just prior to the rolled back transaction operation. In some embodiments, the primary key value corresponding to the specified primary key name is set to the previously stored primary key value (from the transaction log) that had been overwritten by the specified primary key value of the transaction operation. As such, after the update, the primary key value corresponding to the specified primary key name in the key-value store is reverted back to its state prior to the execution of the transaction operation of the transaction branch.

At 1010, the transaction log corresponding to the transaction branch is deleted.

At 1012, it is determined that the specified key name is associated with a dirty write.

At 1014, an alert to an administrator is sent.

When the specified primary key value in the transaction log and the currently stored primary key value corresponding to the same specified primary key name in the current key-value store are not the same, then an alert (e.g., message, notification, prompt, etc.) may be sent to an administrator of the key-value store so that manual processing may be performed to ensure data accuracy in the key-value store.

Figure 11:
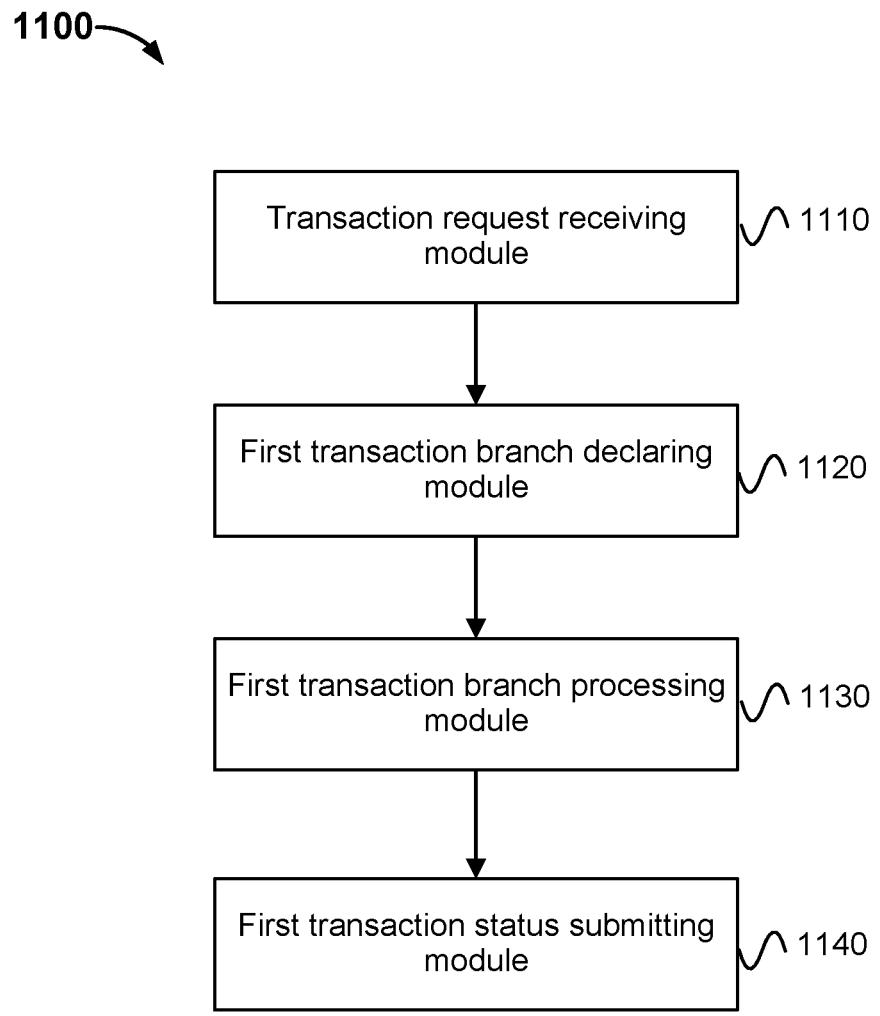
FIG. 11 is an example of a non-relational database transaction processing system in accordance with some embodiments.

FIG. 11 is an example of a non-relational database transaction processing system in accordance with some embodiments. In some embodiments, non-relational database transaction processing system 1100 may be used to execute a process such as process 500 of FIG. 5. In some embodiments, non-relational database transaction processing system 1100 is configured to perform Phase 1 of the 2PC protocol. In the example of FIG. 11, non-relational database transaction processing system 1100 includes transaction request receiving module 1110, first transaction branch declaring module 1120, first transaction branch processing module 1130, and first transaction status submitting module 1140.

The modules, sub-modules, and units described herein can be implemented as software components executing on one or more processors, as hardware such as programmable logic devices, and/or Application Specific Integrated Circuits designed to elements that can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present disclosure. The modules, sub-modules, and units may be implemented on a single device or distributed across multiple devices.

Transaction request receiving module 1110 is configured to receive from a client a transaction request to perform transaction operations associated with a transaction branch directed at a non-relational database. In some embodiments, the transaction request comprises, for example: operation content of the current transaction and the global transaction ID of the distributed transaction associated with the current transaction branch.

First transaction branch declaring module 1120 is configured to send the global transaction ID to the transaction coordinator so as to declare that the current transaction branch is one transaction branch within the distributed transaction and obtain from the transaction coordinator the branch ID corresponding to the transaction branch.

First transaction branch processing module 1130 is configured to analyze the operation content of the current transaction branch based on prior (e.g., machine) learning of non-relational database operation statements. First transaction branch processing module 1030 is also configured to execute transaction operation(s) directed at the non-relational database based on the analysis results and record information associated with the transaction operation(s) in a corresponding transaction log.

First transaction status submitting module 1140 is configured to send a branch status message indicating execution success or failure of the current transaction branch to the transaction coordinator. The branch transaction status message includes the branch ID corresponding to the current transaction branch.

In some embodiments, the non-relational databases may include key-value stores.

Correspondingly, first transaction branch processing module 1130 is specifically configured to:

Analyze the operation content of the current transaction branch based on prior learning of operation statements directed at key-value stores and obtain the primary key name and primary key value specified in the operation content.

Perform a key-value operation directed at the key-value store based on the primary key name and primary key value obtained through analysis.

Take the primary key name and primary key value specified in the operation content of the current transaction branch and, together with the branch ID, write them in associated form into the key-value store so that they serve as the transaction log that corresponds to the current transaction branch.

Figure 12:
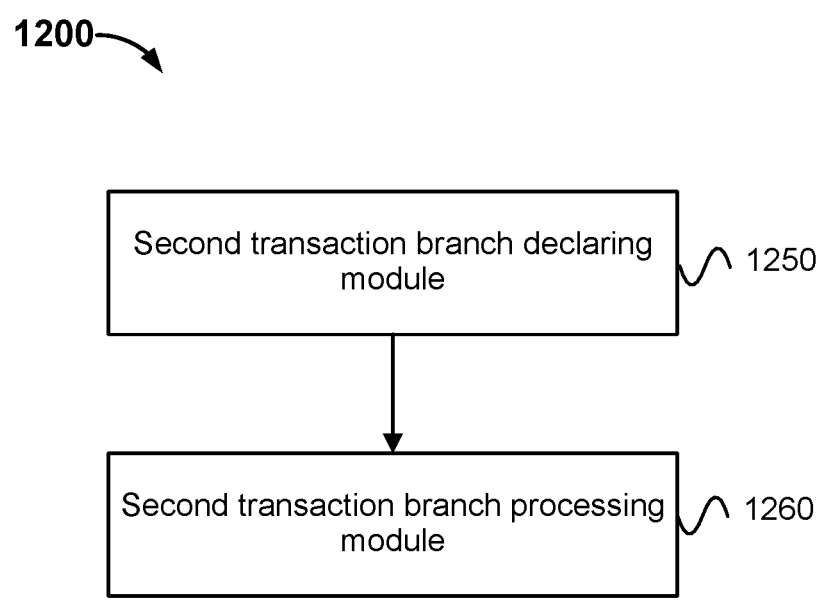
FIG. 12 is an example of a non-relational database transaction processing system in accordance with some embodiments.

FIG. 12 is an example of a non-relational database transaction processing system in accordance with some embodiments. In some embodiments, non-relational database transaction processing system 1200 is configured to perform Phase 1 of the 2PC protocol. In the example of FIG. 12, non-relational database transaction processing system 1200 includes second transaction branch declaring module 1250 and second transaction branch processing module 1260.

During the process of processing a distributed transaction containing transaction operations directed at a non-relational database, second transaction branch declaring module 1250 is configured to declare to the transaction coordinator that transaction operations relating to the non-relational database are a transaction branch within a distributed transaction. Second transaction branch declaring module is configured to obtain from the transaction coordinator the branch ID for the transaction branch.

Second transaction branch processing module 1260 is configured to execute transaction operations directed at the non-relational database and record the corresponding transaction log.

Furthermore, non-relational database transaction processing system 1200 further comprises:

A statement learning module that is configured to perform (e.g., machine) learning of historical non-relational database operation statements to determine rules for processing the non-relational database operation statements.

Second transaction branch processing module 1260 is configured to analyze the operation content of the current non-relational database operation transaction branch based on the learning methods described above, execute transaction operations directed at the non-relational database based on the analysis results, and record the corresponding transaction log.

Furthermore, non-relational database transaction processing system 1200 further comprises:

A second transaction status committing module configured to send a branch status message indicating execution success or failure of a non-relational database operation transaction branch to the transaction coordinator. The transaction status message comprises the branch ID corresponding to the current transaction branch.

Figure 13:
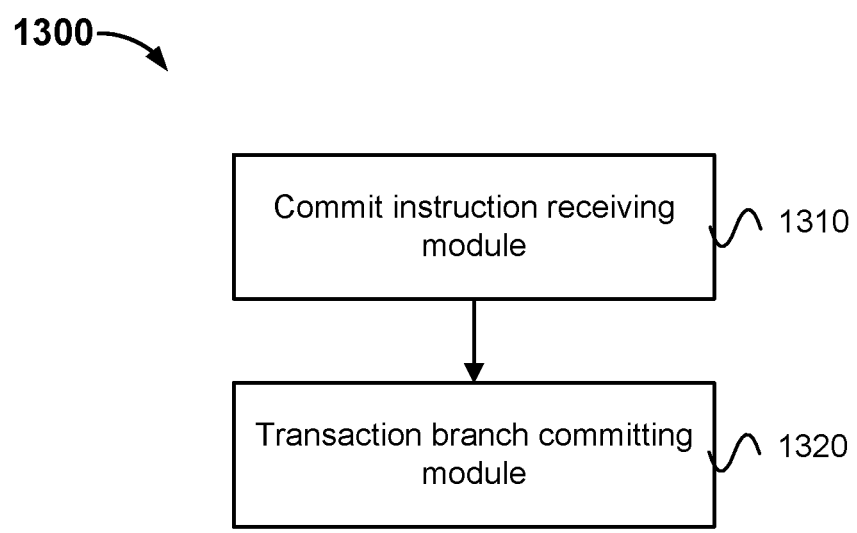
FIG. 13 is an example of a non-relational database transaction processing system in accordance with some embodiments.

FIG. 13 is an example of a non-relational database transaction processing system in accordance with some embodiments. In some embodiments, non-relational database transaction processing system 1300 may be used to execute a process such as process 700 of FIG. 7. In some embodiments, non-relational database transaction processing system 1300 is configured to perform Phase 2 of the 2PC protocol. In the example of FIG. 13, non-relational database transaction processing system 1300 includes commit instruction receiving module 1310 and transaction branch committing module 1320.

Commit instruction receiving module 1310 is configured to receive a transaction commit instruction sent by the transaction coordinator. The transaction commit instruction includes the branch ID that corresponds to the to-be-committed transaction branch that had been executed at the recipient non-relational database. In some embodiments, the transaction commit instruction is issued by the transaction coordinator after the transaction coordinator had received branch status messages indicating that all transaction branches in a distributed transaction that had included the current transaction branch were executed successfully.

Transaction branch committing module 1320 is configured to commit, at the non-relational database, the transaction operations associated with the transaction branch corresponding to the branch ID.

In some embodiments, the non-relational databases may include key-value stores.

Correspondingly, transaction branch committing module 1320 described above is specifically configured to:

Use the branch ID to look up in the key-value store the transaction log generated for the transaction branch and delete it. The transaction log includes one or more, but is not limited to, the following: the primary key name and primary key value specified in the operation content of the current transaction branch and the branch ID, which were stored in associated form.

Figure 14:
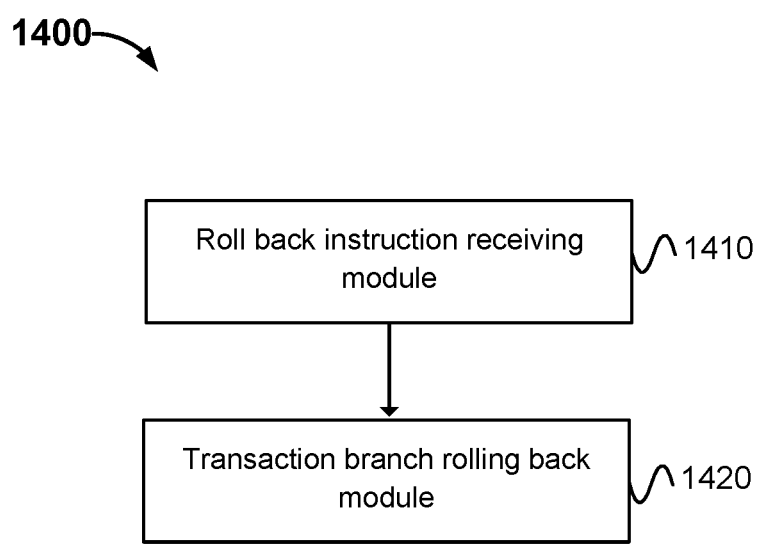
FIG. 14 is an example of a non-relational database transaction processing system in accordance with some embodiments.

FIG. 14 is an example of a non-relational database transaction processing system in accordance with some embodiments. In some embodiments, non-relational database transaction processing system 1400 may be used to execute a process such as process 900 of FIG. 9. In some embodiments, non-relational database transaction processing system 1400 is configured to perform Phase 2 of the 2PC protocol. In the example of FIG. 14, non-relational database transaction processing system 1400 includes roll back instruction receiving module 1410 and transaction branch rolling back module 1420.

Roll back instruction receiving module 1410 is configured to receive a transaction roll back instruction sent by the transaction coordinator. The transaction roll back instruction includes the branch ID that corresponds to the to-be-rolled back transaction branch that had been executed at the recipient non-relational database. In some embodiments, the roll back instruction is issued by the transaction coordinator after receiving at least one branch status message indicating that a corresponding transaction branch in the distributed transaction that includes the to-be-rolled back transaction branch was executed unsuccessfully.

Transaction branch rolling back module 1420 is configured to roll back the transaction branch corresponding to the transaction operations directed at the non-relational database based on the branch ID.

In some embodiments, the non-relational databases may include key-value stores.

Correspondingly, transaction branch rolling back module 1420 may be specifically configured to:

Use the branch ID to look up in the key-value store the transaction log generated for the transaction branch. In some embodiments, the transaction log comprises one or more, but not limited to, the following: the primary key value and primary key name specified in the operation content of the current transaction branch, the branch ID, and the transaction operation; and Locate the entry in the key-value store that matches the primary key name recorded in the transaction log, set the transaction operation corresponding to the primary key name to invalid, and delete the transaction log corresponding to the current transaction branch.

Furthermore, after the branch ID is used to look up the transaction log generated for the transaction branch in the key-value store, transaction branch rolling back module 1420 may be further configured to:

Determine whether the specified primary key value in the transaction log and the currently stored primary key value corresponding to the same primary key name in the current key-value store are the same. If the two key values are the same, then setting the transaction operation corresponding to the primary key name to invalid and deleting the transaction log corresponding to the current transaction branch.

Figure 15:
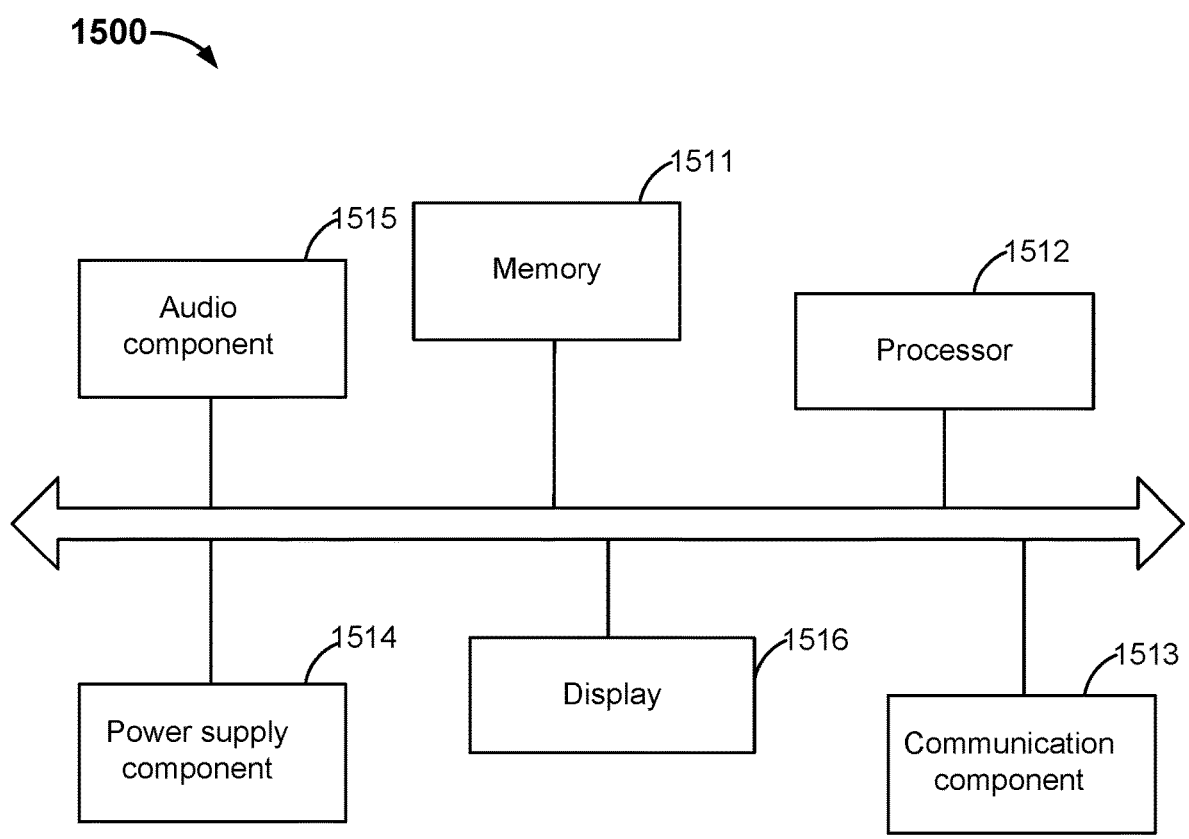
FIG. 15 is a diagram showing an example of a non-relational database transaction processing system.

FIG. 15 is a diagram showing an example of a non-relational database transaction processing system. Functions of system means may be completed with the help of an electronic device. FIG. 15 presents a structural diagram of an electronic device in accordance with some embodiments. System 1500 includes audio component 1515, memory 1511, processor 1512, power supply component 1514, display 1516, and communication component 1513. FIG. 15 merely schematically presents some components without implying that the electronic device comprises only the components shown in FIG. 15.

Memory 1511 is configured to store computer instructions.

Memory 1511 may also be configured to store various types of data in addition to computer instructions in support of operations on the device. Examples of this data include the instructions of any application program or method, contact data, telephone directory data, messages, pictures, video, and other such data used in electronic device operations.

Memory 1511 can be any combination of volatile or non-volatile memory, such as static random access memory (SRAM), electrically erasable programmable read-only memory (EEPROM), erasable programmable read-only memory (EPROM), programmable read-only memory (PROM), read-only memory (ROM), magnetic storage, flash memory, magnetic disks, or optical disks.

Processor 1512, coupled to the memory 1511, is configured to execute computer instructions in memory 1511, which when executed cause processor 1512 to:

Receive, at a non-relational database, a transaction request to perform a transaction branch from a client, wherein the transaction branch is related to a distributed transaction, wherein the transaction request comprises operation content associated with the transaction branch and a global transaction ID associated with the distributed transaction;

Send the global transaction ID to a transaction coordinator to indicate that the transaction branch to be performed at the non-relational database is associated with the distributed transaction;

Receive, at the non-relational database, a branch ID corresponding to the transaction branch from the transaction coordinator;

Determine one or more transaction operations to be performed at the non-relational database from the operation content associated with the transaction branch;

Execute one or more transaction operations at the non-relational database; and

Send a branch status message indicating execution success or failure of the transaction branch to the transaction coordinator, wherein the branch status message includes the branch ID corresponding to the transaction branch.

Communication component 1513 is configured to facilitate wired or wireless communication between the electronic device and other devices. System 1500 may access wireless networks based on a communications standard such as WiFi, 2G, 3G, or combinations thereof. In some embodiments, communication component 1513 is configured to receive via broadcast channels broadcast signals or broadcast-related information from external broadcast management systems. In some embodiments, communication component 1513 further comprises a near-field communication (NFC) module for promoting short-range communication. For example, it can be achieved in the NFC module on the basis of radio-frequency identification (RFID) technology, Infrared Data Association (IrDA) technology, ultra-wide band (UWB) technology, Bluetooth (BT) technology, and other technology.

Power supply component 1514 is configured to provide electric power to the various components of the electronic device. Power supply component 1514 may include a power supply management system, one or more power supplies, and other components related to generating, managing, and allocating power to the electronic device.

Audio component 1515 is configured to output and/or input audio signals. For example, audio component 1515 includes a microphone (MIC). When the electronic device is in an operating mode, e.g., when in calling mode, recording mode, or voice recognition mode, the microphone is configured to receive external audio signals. The received audio signals can be further stored in storage device 1511 or sent by communication component 1513. In some embodiments, audio component 1515 further comprises a speaker for output of audio signals.

Display 1516 includes a screen, and the screen may include a liquid crystal display (LCD) or a touch panel (TP). If the screen comprises a touch panel, the screen may be implemented as a touchscreen to receive input signals from the user. The touch panel comprises one or more touch sensors to detect touch, sliding actions, and gestures on the touch panel. The touch sensor can not only detect the boundaries of touch or slide actions, but also can measure duration and pressure related to touch or slide operations.

Figure 16:
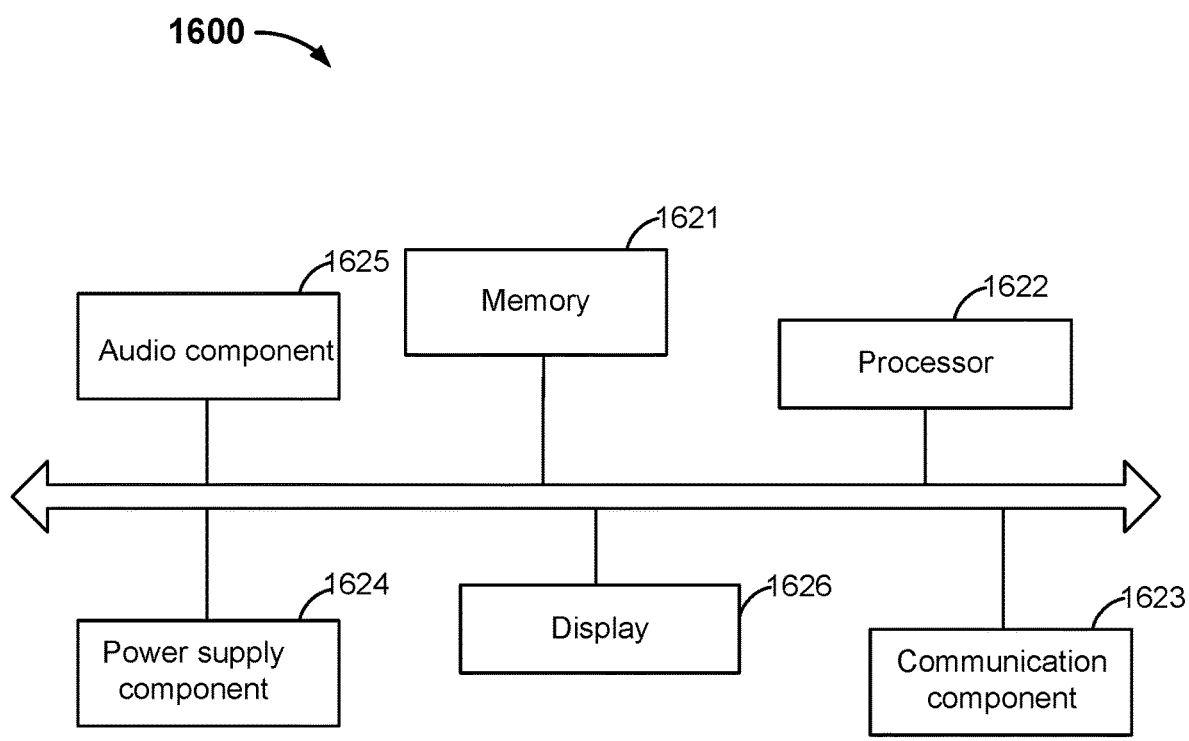
FIG. 16 is a diagram showing an example of a non-relational database transaction processing system.

FIG. 16 is a diagram showing an example of a non-relational database transaction processing system. Functions of system means may be completed with the help of an electronic device. FIG. 16 presents a structural diagram of an electronic device in accordance with some embodiments. System 1600 includes audio component 1625, memory 1621, processor 1622, power supply component 1624, display 1626, and communication component 1623. FIG. 16 merely schematically presents some components without implying that the electronic device comprises only the components shown in FIG. 16.

Memory 1621 is configured to store computer instructions.

Memory 1621 may also be configured to store various types of data in addition to computer instructions in support of operations on the device. Examples of this data include the instructions of any application program or method, contact data, telephone directory data, messages, pictures, video, and other such data used in electronic device operations.

Memory 1621 can be any combination of volatile or non-volatile memory, such as static random access memory (SRAM), electrically erasable programmable read-only memory (EEPROM), erasable programmable read-only memory (EPROM), programmable read-only memory (PROM), read-only memory (ROM), magnetic storage, flash memory, magnetic disks, or optical disks.

Processor 1622, coupled to the memory 1621, is configured to execute computer instructions in memory 1621, which when executed cause processor 1622 to:

During the process of processing a global transaction containing transaction operations directed at a non-relational database, declare to the transaction coordinator that transaction operations relating to the non-relational database are a transaction branch included in the distributed transaction, and obtain from the transaction coordinator the branch ID for the transaction branch;

Execute transaction operations directed at the non-relational database and record the corresponding transaction log.

Communication component 1623 is configured to facilitate wired or wireless communication between the electronic device and other devices. The electronic device may access wireless networks based on a communications standard such as WiFi, 2G, 3G, or combinations thereof. In some embodiments, communication component 1623 receives via broadcast channels broadcast signals or broadcast-related information from external broadcast management systems. In some embodiments, communication component 1623 further comprises a near-field communication (NFC) module for promoting short-range communication. For example, it can be achieved in the NFC module on the basis of radio-frequency identification (RFID) technology, Infrared Data Association (IrDA) technology, ultra-wide band (UWB) technology, Bluetooth (BT) technology, and other technology.

Power supply component 1624 provides electric power to the various components of the electronic device. Power supply component 1624 may include a power supply management system, one or more power supplies, and other components related to generating, managing, and allocating power to the electronic device.

Audio component 1625 is configured to output and/or input audio signals. For example, audio component 1625 includes a microphone (MIC). When the electronic device is in an operating mode, e.g., when in calling mode, recording mode, or voice recognition mode, the microphone is configured to receive external audio signals. The received audio signals can be further stored in memory 1621 or sent by communication component 1623. In some embodiments, audio component 1625 further comprises a speaker for output of audio signals.

Display 1226 includes a screen, and the screen may include a liquid crystal display (LCD) or a touch panel (TP). If the screen comprises a touch panel, the screen may be implemented as a touchscreen to receive input signals from the user. The touch panel comprises one or more touch sensors to detect touch, sliding actions, and gestures on the touch panel. The touch sensor can not only detect the boundaries of touch or slide actions, but also can measure duration and pressure related to touch or slide operations.

Figure 17:
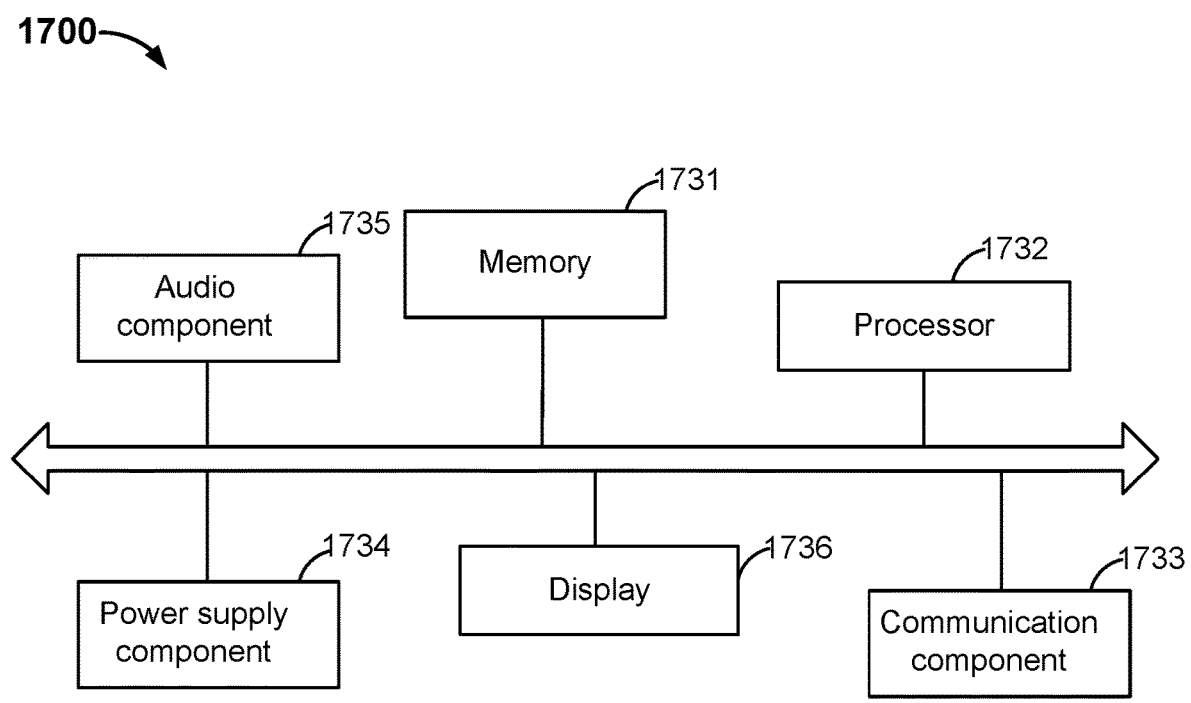
FIG. 17 is a diagram showing an example of a non-relational database transaction processing system.

FIG. 17 is a diagram showing an example of a non-relational database transaction processing system. Functions of system means may be completed with the help of an electronic device. FIG. 17 presents a structural diagram of an electronic device in accordance with some embodiments. System 1700 includes audio component 1735, memory 1731, processor 1732, power supply component 1734, display 1736, and communication component 1733. FIG. 17 merely schematically presents some components without implying that the electronic device comprises only the components shown in FIG. 17.

Memory 1731 is configured to store computer instructions.

Memory 1731 may also be configured to store various types of data in addition to computer instructions in support of operations on the device. Examples of this data include the instructions of any application program or method, contact data, telephone directory data, messages, pictures, video, and other such data used in electronic device operations.

Memory 1731 can be any combination of volatile or non-volatile memory, such as static random access memory (SRAM), electrically erasable programmable read-only memory (EEPROM), erasable programmable read-only memory (EPROM), programmable read-only memory (PROM), read-only memory (ROM), magnetic storage, flash memory, magnetic disks, or optical disks.

Processor 1732, coupled to the memory 1731, is configured to execute computer instructions in memory 1731, which when executed cause processor 1732 to:

Receive from a transaction coordinator a transaction commit instruction to commit a transaction branch at a non-relational database, wherein the transaction commit instruction includes a branch ID corresponding to the transaction branch; and In response to the transaction commit instruction, commit at the non-relational database the transaction branch corresponding to the branch ID.

Communication component 1733 is configured to facilitate wired or wireless communication between the electronic device and other devices. The electronic device may access wireless networks based on a communications standard such as WiFi, 2G, 3G, or combinations thereof. In an exemplary embodiment, communication component 1733 receives via broadcast channels broadcast signals or broadcast-related information from external broadcast management systems. In an exemplary embodiment, communication component 1733 further comprises a near-field communication (NFC) module for promoting short-range communication. For example, it can be achieved in the NFC module on the basis of radio-frequency identification (RFID) technology, Infrared Data Association (IrDA) technology, ultra-wide band (UWB) technology, Bluetooth (BT) technology, and other technology.

Power supply component 1734 provides electric power to the various components of the electronic device. Power supply component 1734 may include a power supply management system, one or more power supplies, and other components related to generating, managing, and allocating power to the electronic device.

Audio component 1735 is configured to output and/or input audio signals. For example, audio component 1735 includes a microphone (MIC). When the electronic device is in an operating mode, e.g., when in calling mode, recording mode, or voice recognition mode, the microphone is configured to receive external audio signals. The received audio signals can be further stored in memory 1731 or sent by communication component 1733. In some embodiments, audio component 1735 further comprises a speaker for output of audio signals.

Display 1736 includes a screen, and the screen may include a liquid crystal display (LCD) or a touch panel (TP). If the screen comprises a touch panel, the screen may be implemented as a touchscreen to receive input signals from the user. The touch panel comprises one or more touch sensors to detect touch, sliding actions, and gestures on the touch panel. The touch sensor can not only detect the boundaries of touch or slide actions, but also can measure duration and pressure related to touch or slide operations.

Figure 18:
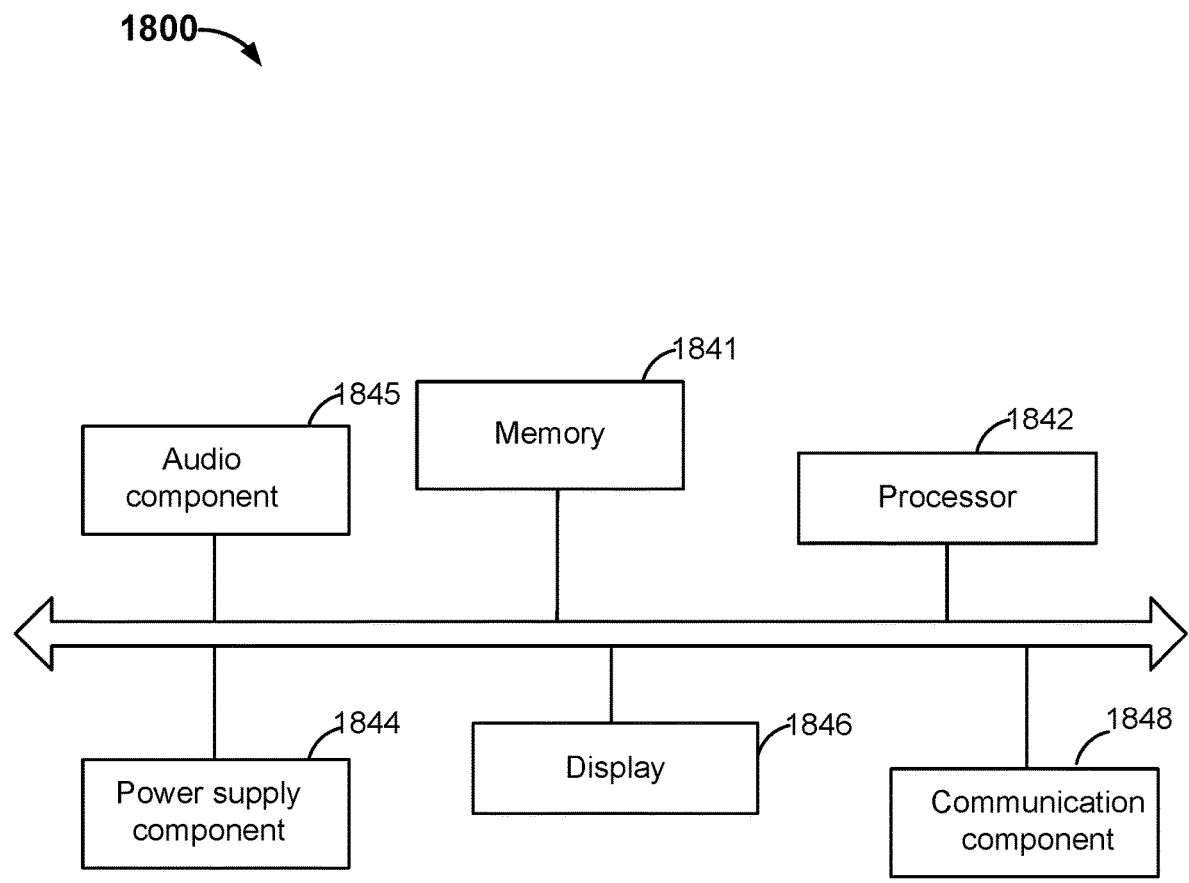
FIG. 18 is a diagram showing an example of a non-relational database transaction processing system.

FIG. 18 is a diagram showing an example of a non-relational database transaction processing system. Functions of system means may be completed with the help of an electronic device. FIG. 18 presents a structural diagram of an electronic device in accordance with some embodiments. System 1800 includes audio component 1845, memory 1841, processor 1842, power supply component 1844, display 1846, and communication component 1848. FIG. 18 merely schematically presents some components without implying that the electronic device comprises only the components shown in FIG. 18.

Memory 1841 is configured to store computer instructions.

Memory 1841 may also be configured to store various types of data in addition to computer instructions in support of operations on the device. Examples of this data include the instructions of any application program or method, contact data, telephone directory data, messages, pictures, video, and other such data used in electronic device operations.

Memory 1841 can be any combination of volatile or non-volatile memory, such as static random access memory (SRAM), electrically erasable programmable read-only memory (EEPROM), erasable programmable read-only memory (EPROM), programmable read-only memory (PROM), read-only memory (ROM), magnetic storage, flash memory, magnetic disks, or optical disks.

Processor 1842, coupled to the memory 1841, is configured to execute computer instructions in memory 1841, which when executed cause processor 1842 to:

Receive a transaction roll back instruction to roll back a transaction branch at a non-relational database from a transaction coordinator, wherein the transaction roll back instruction includes a branch ID corresponding to the transaction branch;

In response to the transaction roll back instruction, roll back the transaction branch corresponding to the branch ID at the non-relational database.

Communication component 1848 is configured to facilitate wired or wireless communication between the electronic device and other devices. The electronic device may access wireless networks based on a communications standard such as WiFi, 2G, 3G, or combinations thereof. In some embodiments, communication component 1848 receives via broadcast channels broadcast signals or broadcast-related information from external broadcast management systems. In some embodiments, communication component 1848 further comprises a near-field communication (NFC) module for promoting short-range communication. For example, it can be achieved in the NFC module on the basis of radio-frequency identification (RFID) technology, Infrared Data Association (IrDA) technology, ultra-wide band (UWB) technology, Bluetooth (BT) technology, and other technology.

Power supply component 1844 provides electric power to the various components of the electronic device. Power supply component 1844 may include a power supply management system, one or more power supplies, and other components related to generating, managing, and allocating power to the electronic device.

Audio component 1845 is configured to output and/or input audio signals. For example, audio component 1845 includes a microphone (MIC). When the electronic device is in an operating mode, e.g., when in calling mode, recording mode, or voice recognition mode, the microphone is configured to receive external audio signals. The received audio signals can be further stored in memory 1841 or sent by communication component 1848. In some embodiments, audio component 1845 further comprises a speaker for output of audio signals.

Display 1846 includes a screen, and the screen may include a liquid crystal display (LCD) or a touch panel (TP). If the screen comprises a touch panel, the screen may be implemented as a touchscreen to receive input signals from the user. The touch panel comprises one or more touch sensors to detect touch, sliding actions, and gestures on the touch panel. The touch sensor can not only detect the boundaries of touch or slide actions, but also can measure duration and pressure related to touch or slide operations.

The modules or components described above can be implemented as software components executing on one or more processors, as hardware components such as programmable logic devices (e.g., microprocessors, field-programmable gate arrays (FPGAs), digital signal processors (DSPs), etc.), Application Specific Integrated Circuits (ASICs) designed to perform certain functions, or a combination thereof. In some embodiments, the modules or components can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present application. The modules or components may be implemented on a single device or distributed across multiple devices. The functions of the module components may be merged into one another or further split into multiple sub-modules or sub-components.

Persons having ordinary skill in the art may understand that all or some of the steps needed to implement the method embodiments above may be completed by programs instructing relevant hardware. The aforementioned programs may be stored in computer-readable media. When the programs are being executed, the execution comprises the steps of the method embodiments described above. Moreover, the aforementioned storage media include: ROM, RAM, magnetic or optical disks, and all other media capable of storing program code.

Lastly, it should be noted that the above embodiments serve only to explain the technical schemes of the present application and not to limit it. Although the present application was explained in detail with reference to the above-described embodiments, persons having ordinary skill in the art should understand that they may still modify the technical schemes recorded in the various embodiments described above or provide equivalent substitutions for some or all of their technical features, and that these modifications or substitutions do not cause the corresponding technical schemes to substantively depart from the scope of the technical schemes of the various embodiments of the present application.

Although the foregoing embodiments have been described in some detail for purposes of clarity of understanding, the disclosure is not limited to the details provided. There are many alternative ways of implementing the disclosure. The disclosed embodiments are illustrative and not restrictive.

What is claimed is:

1. A system, comprising:
one or more processors configured to:
 receive, at a non-relational database, a transaction request to perform a transaction branch from a client, wherein the non-relational database comprises a key-value store; wherein:
  the transaction branch is related to a distributed transaction; and
  the transaction request comprises operation content associated with the transaction branch and a global transaction ID associated with the distributed transaction;
 send the global transaction ID to a transaction coordinator to indicate that the transaction branch to be performed at the non-relational database is associated with the distributed transaction;
 receive, at the non-relational database, a branch ID corresponding to the transaction branch from the transaction coordinator;
 determine one or more transaction operations to be performed at the non-relational database from the operation content associated with the transaction branch;
 execute the one or more transaction operations at the non-relational database;
 generate a transaction log corresponding to the transaction branch, wherein the transaction log comprises a specified primary key name associated with the operation content, a specified primary key value associated with the operation content, and the branch ID;
 send a branch status message indicating execution success or failure of the transaction branch to the transaction coordinator, wherein the branch status message includes the branch ID corresponding to the transaction branch;
 receive, at the non-relational database, from the transaction coordinator a transaction roll back instruction to roll back the transaction branch, wherein the transaction roll back instruction includes the branch ID corresponding to the transaction branch; and in response to the transaction roll back instruction, roll back at the non-relational database the transaction branch corresponding to the branch ID, including to:
locate the transaction log corresponding to the transaction branch using the branch ID;
locate an entry in the key-value store that matches the specified primary key name associated with the transaction log; and
determine whether a currently stored primary key value in the entry matches the specified primary key value associated with the transaction log; and
one or more memories coupled to the one or more processors and configured to provide instructions to the one or more processors.

2. The system of claim 1, wherein the global transaction ID is assigned to the distributed transaction by the transaction coordinator.

3. The system of claim 1, wherein the one or more processors are further configured to record the branch ID corresponding to the transaction branch.

4. The system of claim 1, wherein the one or more processors are further configured to:
store the transaction log at the non-relational database.

5. The system of claim 1, wherein the transaction request comprises a first transaction request, wherein the distributed transaction comprises a first distributed transaction, wherein the transaction branch comprises a first transaction branch associated with the first transaction request, wherein the branch ID comprises a first branch ID, wherein the transaction log comprises a first transaction log, and wherein the one or more processors are further configured to:
receive, at the non-relational database, a second branch ID corresponding to a second transaction branch from the transaction coordinator, wherein the second transaction branch is associated with a second distributed transaction;
receive, at the non-relational database, from the transaction coordinator a transaction commit instruction to commit the second transaction branch, wherein the transaction commit instruction includes the second branch ID corresponding to the second transaction branch; and
in response to the transaction commit instruction, commit at the non-relational database the second transaction branch corresponding to the second branch ID, including to delete a second transaction log associated with the second branch ID.

6. The system of claim 5, wherein the second distributed transaction comprises a plurality of transaction branches, wherein the transaction commit instruction was sent from the transaction coordinator in response to the transaction coordinator receiving a plurality of branch status messages corresponding to respective ones of the plurality of transaction branches, and wherein the plurality of branch status messages indicates execution successes.

7. The system of claim 5, wherein the one or more processors are further configured to locate the second transaction log corresponding to the second transaction branch using the second branch ID.

8. The system of claim 4, wherein the one or more processors are further configured to:
in the event that the currently stored primary key value in the entry matches the specified primary key value:
revert a data value affected by the transaction branch to a state prior to an execution of the one or more transaction operations; and
delete the transaction log.

9. The system of claim 8, wherein the distributed transaction comprises a plurality of transaction branches, wherein the transaction roll back instruction was sent from the transaction coordinator in response to the transaction coordinator receiving a plurality of branch status messages corresponding to respective ones of the plurality of transaction branches, and wherein the plurality of branch status messages indicates at least one execution failure.

10. The system of claim 8, wherein the one or more processors are further configured to:
in the event that the currently stored primary key value in the entry matches the specified primary key value:
set the one or more transaction operations to invalid; and
update the currently stored primary key value to a previously stored primary key value.

11. The system of claim 8, wherein the one or more processors are further configured to:
locate the transaction log corresponding to the transaction branch using the branch ID; and
in the event that the currently stored primary key value in the entry does not match the specified primary key value associated with the transaction log, send an alert to an administrator.

12. A method, comprising:
receiving, at a non-relational database, a transaction request to perform a transaction branch from a client, wherein the non-relational database comprises a key-value store, wherein:
the transaction branch is related to a distributed transaction; and
the transaction request comprises operation content associated with the transaction branch and a global transaction ID associated with the distributed transaction;
sending the global transaction ID to a transaction coordinator to indicate that the transaction branch to be performed at the non-relational database is associated with the distributed transaction;
receiving, at the non-relational database, a branch ID corresponding to the transaction branch from the transaction coordinator;
determining one or more transaction operations to be performed at the non-relational database from the operation content associated with the transaction branch;
executing the one or more transaction operations at the non-relational database;
generating a transaction log corresponding to the transaction branch, wherein the transaction log comprises a specified primary key name associated with the operation content, a specified primary key value associated with the operation content, and the branch ID;
sending a branch status message indicating execution success or failure of the transaction branch to the transaction coordinator, wherein the branch status message includes the branch ID corresponding to the transaction branch;
receiving, at the non-relational database, from the transaction coordinator a transaction roll back instruction to roll back the transaction branch, wherein the transaction roll back instruction includes the branch ID corresponding to the transaction branch; and
in response to the transaction roll back instruction, rolling back at the non-relational database the transaction branch corresponding to the branch ID, including:

locating the transaction log corresponding to the transaction branch using the branch ID;
locating an entry in the key-value store that matches the specified primary key name associated with the transaction log; and
determining whether a currently stored primary key value in the entry matches the specified primary key value associated with the transaction log.

13. The method of claim 12, further comprising:
storing the transaction log at the non-relational database.

14. The method of claim 12, wherein the transaction request comprises a first transaction request, wherein the distributed transaction comprises a first distributed transaction, wherein the transaction branch comprises a first transaction branch associated with the first transaction request, wherein the branch ID comprises a first branch ID, wherein the transaction log comprises a first transaction log, and the method further comprising:
receiving, at the non-relational database, a second branch ID corresponding to a second transaction branch from the transaction coordinator, wherein the second transaction branch is associated with a second distributed transaction;
receiving, at the non-relational database, from the transaction coordinator a transaction commit instruction to commit the second transaction branch, wherein the transaction commit instruction includes the second branch ID corresponding to the second transaction branch; and
in response to the transaction commit instruction, committing at the non-relational database the second transaction branch corresponding to the second branch ID, including deleting a second transaction log associated with the second branch ID.

15. The method of claim 14, wherein the second distributed transaction comprises a plurality of transaction branches, wherein the transaction commit instruction was sent from the transaction coordinator in response to the transaction coordinator receiving a plurality of branch status messages corresponding to respective ones of the plurality of transaction branches, and wherein the plurality of branch status messages indicates execution successes.

16. The method of claim 14, further comprising locating the second transaction log corresponding to the second transaction branch using the second branch ID.

17. The method of claim 13, further comprising:
in the event that the currently stored primary key value in the entry matches the specified primary key value:
reverting a data value affected by the transaction branch to a state prior to an execution of the one or more transaction operations; and
deleting the transaction log.

18. The method of claim 17, wherein the distributed transaction comprises a plurality of transaction branches, wherein the transaction roll back instruction was sent from the transaction coordinator in response to the transaction coordinator receiving a plurality of branch status messages corresponding to respective ones of the plurality of transaction branches, and wherein the plurality of branch status messages indicates at least one execution failure.

19. The method of claim 17, further comprising:
in the event that the currently stored primary key value in the entry matches the specified primary key value:
setting the one or more transaction operations to invalid; and
updating the currently stored primary key value to a previously stored primary key value.

20. A computer program product, the computer program product being embodied in a non-transitory computer-readable storage medium and comprising computer instructions for:
receiving, at a non-relational database, a transaction request to perform a transaction branch from a client, wherein the non-relational database comprises a key-value store, wherein:
the transaction branch is related to a distributed transaction: and
the transaction request comprises operation content associated with the transaction branch and a global transaction ID associated with the distributed transaction;
sending the global transaction ID to a transaction coordinator to indicate that the transaction branch to be performed at the non-relational database is associated with the distributed transaction;
receiving, at the non-relational database, a branch ID corresponding to the transaction branch from the transaction coordinator;
determining one or more transaction operations to be performed at the non-relational database from the operation content associated with the transaction branch;
executing the one or more transaction operations at the non-relational database;
generating a transaction log corresponding to the transaction branch, wherein the transaction log comprises a specified primary key name associated with the operation content, a specified primary key value associated with the operation content, and the branch ID;
sending a branch status message indicating execution success or failure of the transaction branch to the transaction coordinator, wherein the branch status message includes the branch ID corresponding to the transaction branch;
receiving, at the non-relational database, from the transaction coordinator a transaction roll back instruction to roll back the transaction branch, wherein the transaction roll back instruction includes the branch ID corresponding to the transaction branch; and
in response to the transaction roll back instruction, rolling back at the non-relational database the transaction branch corresponding to the branch ID, including:
locating the transaction log corresponding to the transaction branch using the branch ID;
locating an entry in the key-value store that matches the specified primary key name associated with the transaction log; and
determining whether a currently stored primary key value in the entry matches the specified primary key value associated with the transaction log.

* * * * *